United States Patent
Kalach et al.

(10) Patent No.: US 10,313,124 B1
(45) Date of Patent: Jun. 4, 2019

(54) PUBLIC KEY VALIDATION IN SUPERSINGULAR ISOGENY-BASED CRYPTOGRAPHIC PROTOCOLS

(71) Applicant: ISARA Corporation, Waterloo (CA)

(72) Inventors: Kassem Kalach, Waterloo (CA); Anton Mosunov, Waterloo (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 16/220,074

(22) Filed: Dec. 14, 2018

Related U.S. Application Data

(62) Division of application No. 15/887,240, filed on Feb. 2, 2018.

(51) Int. Cl.
| | | |
|---|---|---|
| *H04L 29/06* | (2006.01) | |
| *H04L 9/30* | (2006.01) | |
| *H04L 9/08* | (2006.01) | |
| *H04L 9/14* | (2006.01) | |

(52) U.S. Cl.
CPC ............ *H04L 9/3073* (2013.01); *H04L 9/085* (2013.01); *H04L 9/0819* (2013.01); *H04L 9/0861* (2013.01); *H04L 9/14* (2013.01); *H04L 63/0428* (2013.01)

(58) Field of Classification Search
CPC ....... H04L 9/30; H04L 9/3006; H04L 9/3066; H04L 9/3073; H04L 9/0819; H04L 9/085; H04L 9/0861; H04L 9/14; H04L 63/0428
USPC ......................................................... 713/171
See application file for complete search history.

(56) References Cited

U.S. PATENT DOCUMENTS

| | | | |
|---|---|---|---|
| 10,116,443 B1 | 10/2018 | Kalach et al. | |
| 2004/0139029 A1 | 7/2004 | Zhang et al. | |
| 2009/0210716 A1 | 8/2009 | Chen | |
| 2010/0329454 A1 | 12/2010 | Takashima | |
| 2012/0210118 A1 | 8/2012 | Chaves et al. | |
| 2013/0297929 A1 | 11/2013 | Chaves et al. | |
| 2016/0087802 A1* | 3/2016 | Peeters | G06F 7/725 713/176 |

OTHER PUBLICATIONS

Costello, Craig, Patrick Longa, and Michael Naehrig. "Efficient algorithms for supersingular isogeny Diffie-Hellman." Annual Cryptology Conference. Springer, Berlin, Heidelberg, 2016 (Year: 2016).*

(Continued)

*Primary Examiner* — Yogesh Paliwal
(74) *Attorney, Agent, or Firm* — Henry Patent Law Firm PLLC

(57) ABSTRACT

In a general aspect, a supersingular isogeny-based cryptography process is performed. In some aspects, a first generator point is computed based on a secret integer of a first entity and a pair of elliptic curve points defined by a supersingular isogeny-based cryptosystem. An image curve is computed based on the secret integer, and a shared secret value is computed based on the image curve. An encrypted generator point is computed from the first generator point and the shared secret value. A public key of the first entity is sent to a second entity to enable the second entity to compute the shared secret value. The encrypted generator point is sent to the second entity to enable the second entity to validate the public key of the first entity.

18 Claims, 6 Drawing Sheets

(56) References Cited

OTHER PUBLICATIONS

Kirkwood, Daniel, Bradley C. Lackey, John McVey, Mark Motley, Jerome A. Solinas, and David Tuller. "Failure is not an option: standardization issues for post-quantum key agreement." In Workshop on Cybersecurity in a Post-Quantum World. 2015 (Year: 2015).*
USPTO, Non-Final Office Action dated May 4, 2018, in U.S. Appl. No. 15/887,348, 11 pgs.
USPTO, Notice of Allowance dated Sep. 4, 2018, in U.S. Appl. No. 15/887,348, 9 pgs.
Costello, et al., "Efficient algorithms for supersingular isogeny Diffie-Hellman", IACR-CRYPTO-2016; https://eprint.iacr.org/20161413, 2016, 35 pgs.
De Fed, et al., "Towards quantum-resistant cryptosystems from supersingular elliptic curve isogenies", https://eprint.iacr.org/2011/506, 2011, 25 pgs.
Dent, Alexander, "A Designer's Guide to KEMs", Cryptology ePrint Archive: Report 2002/174, Oct. 31, 2005, 28 pages.
Fujisaki, et al., "Secure Integration of Asymmetric and Symmetric Encryption Schemes", CRYTO' 99, LNCS 1666, pp. 537-554, 1999, 18 pgs.
Galbraith, Steven, "On the Security of Supersingular Isogeny Cryptosystems", Cryptology ePrint Archive: Report 2016/859, Jan. 31, 2017, 21 pages.
Kirkwood, et al., "Failure is not an Option: Standardization Issues for Post-Quantum Key Agreement", Accessed online Nov. 29, 2017 at https://csrc.nist.gov/csrc/media/events/workshop-on-cybersecurity-in-a-post-quantum-world/documents/presentations/session7-motley-mark.pdf, 2015, 21 pgs.

* cited by examiner

PUBLIC KEY VALIDATION IN SUPERSINGULAR ISOGENY-BASED CRYPTOGRAPHIC PROTOCOLS

CROSS REFERENCE TO RELATED APPLICATIONS

This application is a divisional of U.S. patent application Ser. No. 15/887,240, filed Feb. 2, 2018, entitled "Public Key Validation in Supersingular Isogeny-Based Cryptographic Protocols," which is incorporated herein by reference.

BACKGROUND

The following description relates to verifying data in supersingular isogeny-based cryptographic protocols.

Cryptography systems are used to communicate securely over public channels. For example, some cryptography systems provide confidentiality by encrypting messages, and some cryptography systems provide authenticity through digital signatures. Some cryptography systems operate using public keys, private keys and shared secrets.

DETAILED DESCRIPTION

Figure 1:
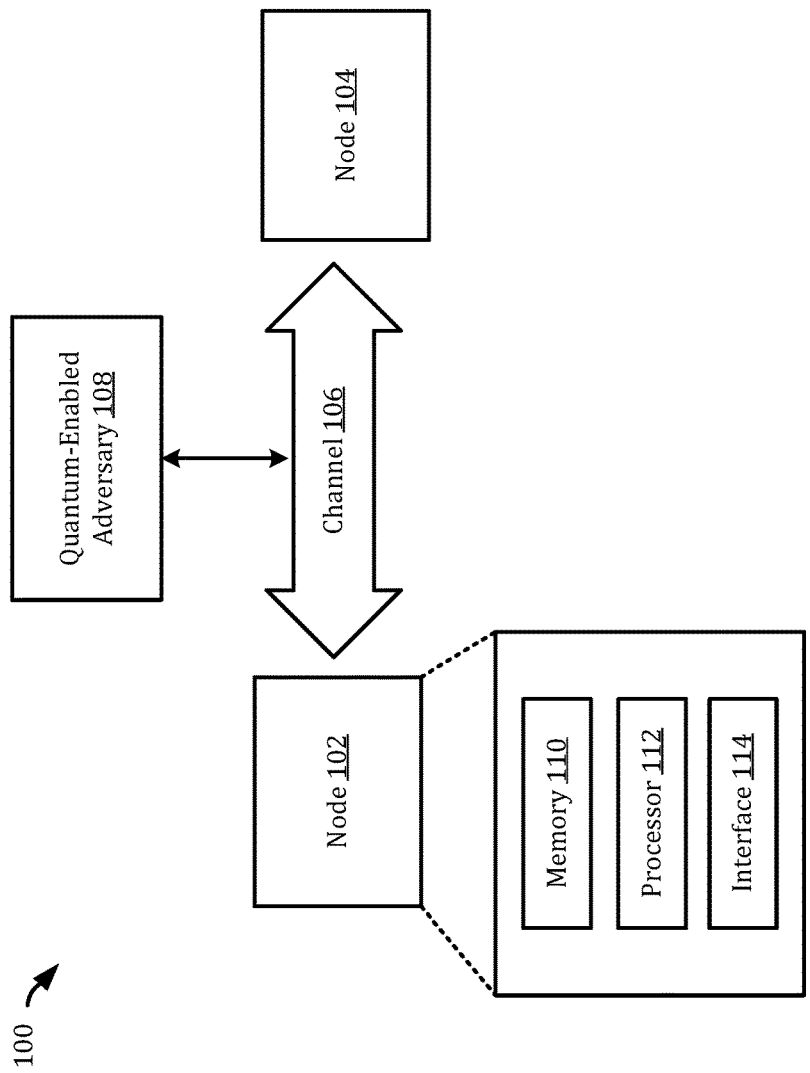
FIG. 1 is a block diagram showing aspects of an example communication system.

In some aspects of the present disclosure, improved supersingular isogeny-based cryptographic protocols are described. The supersingular isogeny Diffie-Hellman key agreement protocol (SIDH) is an example of a supersingular isogeny-based cryptographic protocol that is believed to be secure against attacks carried out by quantum computers. In some SIDH deployments, if one of the entities reuses its secret key (e.g., as a static private key), then the secret key can be efficiently recovered, for example, with the active attack described by Galbraith et al. (Galbraith, et al., "On the security of supersingular isogeny cryptosystems," *Advances in Cryptology—ASIACRYPT* 2016. Lecture Notes in Computer Science vol. 10031. Springer, Berlin, Heidelberg, pp. 63-91, 2016.) A countermeasure to this attack was described by Kirkwood et al. (Kirkwood, et al., "Failure is not an option: standardization issues for post-quantum key agreement," *Workshop on Cybersecurity in a Post*-Quantum World, 2015.). However, existing countermeasures are computationally expensive and therefore time consuming and less practical. Here we describe supersingular isogeny-based cryptographic protocols that include improved countermeasures, for example, countermeasures that allow faster computations while achieving the same or otherwise acceptable security levels.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptosystems, for example, making them more secure, more computationally efficient or providing other advantages in some instances.

In some implementations, the techniques described here can be used to neutralize or otherwise reduce exposure to an attack on a supersingular isogeny-based cryptographic protocol, for example, the active attack proposed by Galbraith et al. and potentially other types of attacks. The active attack proposed by Galbraith et al. is performed by one of the two entities ("Alice" and "Bob") executing an SIDH protocol. In particular, the attack allows Bob to recover Alice's secret key efficiently one bit a time. In order to determine the i-th bit of Alice's secret key, Bob sends Alice an incorrect public key $(E_B, U_i, V_i)$ instead of the correct public key $(E_B, \phi_B(P_A), \phi_B(Q_A))$, where $U_1$ and $V_i$ are some linear combinations of $\phi_B(P_A)$ and $\phi_B(Q_A)$. In the cryptographic protocols described here, one of the entities ("Alice") validates the public key of the other entity ("Bob") in a manner that neutralizes or otherwise reduces exposure to an attack of the type described by Galbraith et al.

In some cryptographic protocols (including the example protocol 300 shown in FIGS. 3A-3B and variants), Bob sends (an encrypted version of) his secret generator $G_B$ instead of a random seed. By receiving the secret generator $G_B$ from Bob, Alice can validate Bob's public key without having to duplicate all of Bob's computations to derive the public key. For example, Alice may avoid the computation of both $\beta'=PRF(r_B')$ and $G_B'=P_B+[\beta']Q_B$, where PRF represents a pseudorandom function that generates the integer $\beta'$ from the random seed $r_B'$. Given that $\beta'$ is a number whose magnitude is approximately equal to $3^m$, this prevents Alice from computing an expensive operation of scalar multiplication by a large number $\beta'$.

Figure 3A:
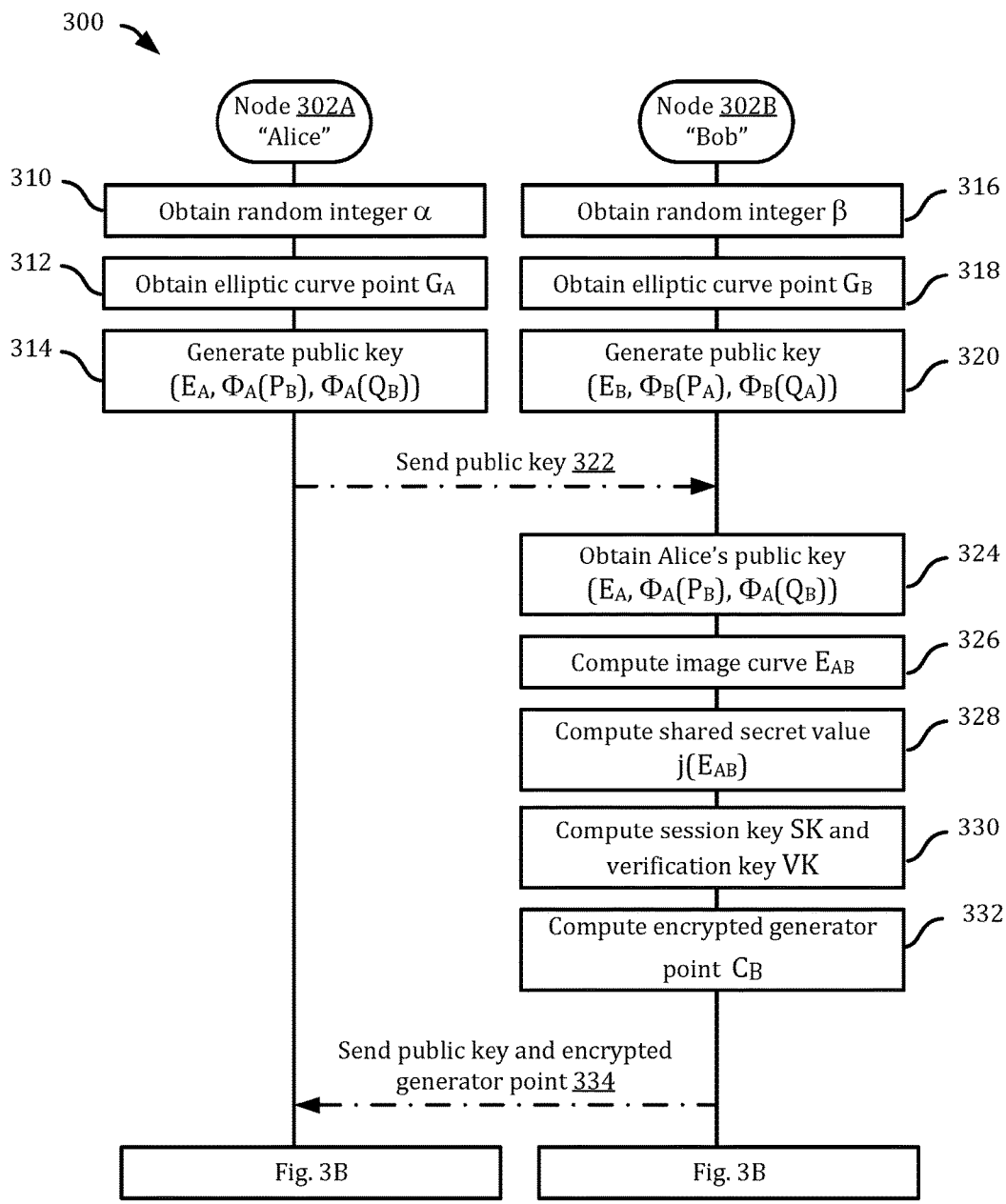
FIGS. 3A-3B are flow diagrams showing an example supersingular isogeny-based cryptographic protocol.
Figure 3B:
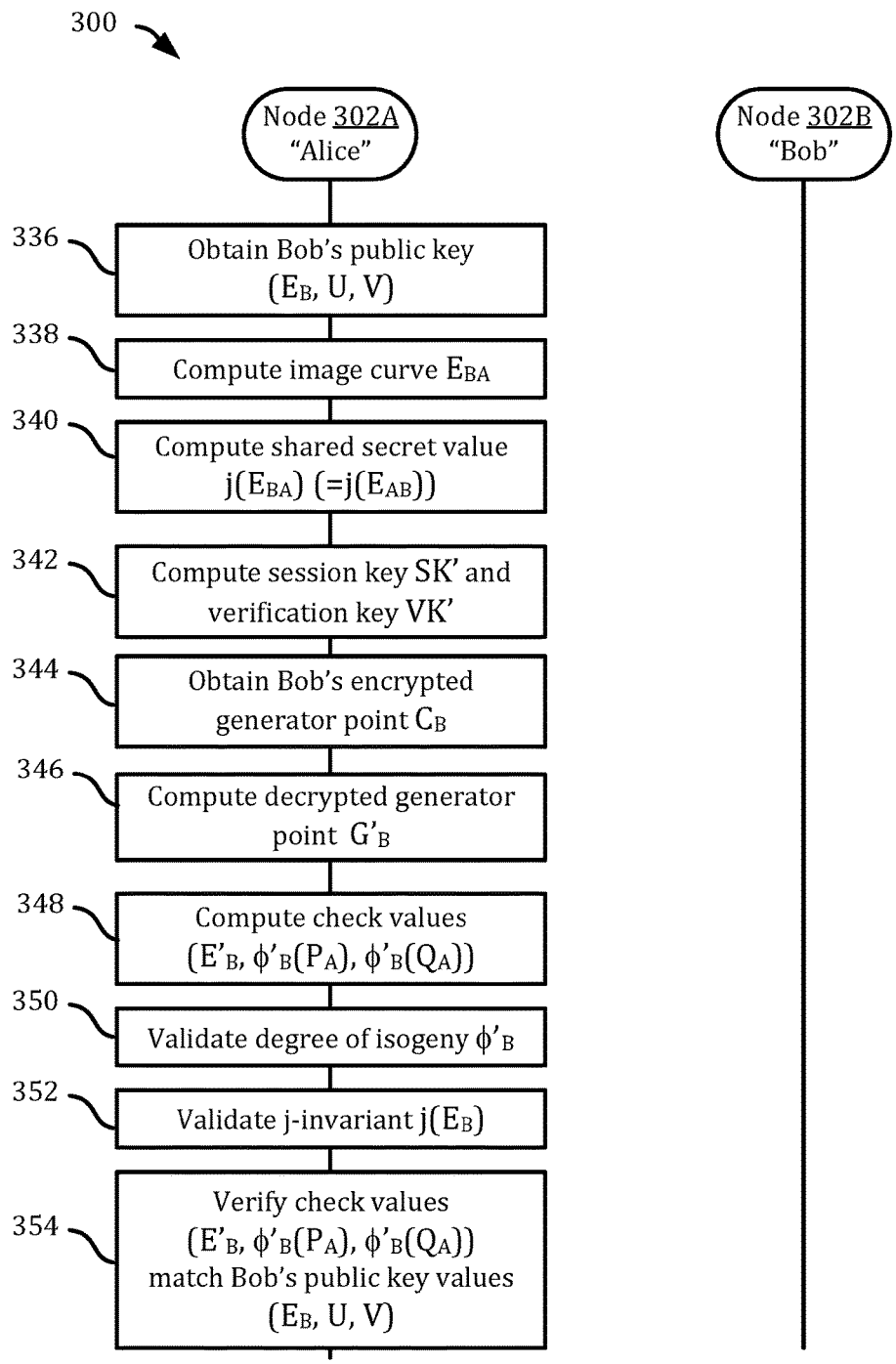

In addition, the example protocol 300 shown in FIGS. 3A-3B is secure, despite the fact that (potentially dishonest) Bob has several options to modify the data sent to Alice. In particular, Bob can provide a generator point $G_B$ that does not have a full order. Or instead of sending the correct generator point $G_B$, Bob can send a different generator of the subgroup $\langle G_B \rangle$. However, by validating the degree of the isogeny defined by $G_B$ (e.g., validating $\deg(\phi_B')=3^m$), Alice can detect if Bob provides a generator point $G_B$ that does not have a full order. This condition can be verified in the process of isogeny evaluation, and, at least in some cases, does not require any significant additional computational overhead. Further, by verifying certain conditions (e.g., $j(E_B) \neq 0, 1728, E_B'=E_B, \phi_B'(P_A)=U$ and $\phi_B'(Q_A)=V$), Alice can ensure that, by providing alternative generators of $\langle G_B \rangle$, Bob does not learn any information about Alice's secret key.

Figure 4A:
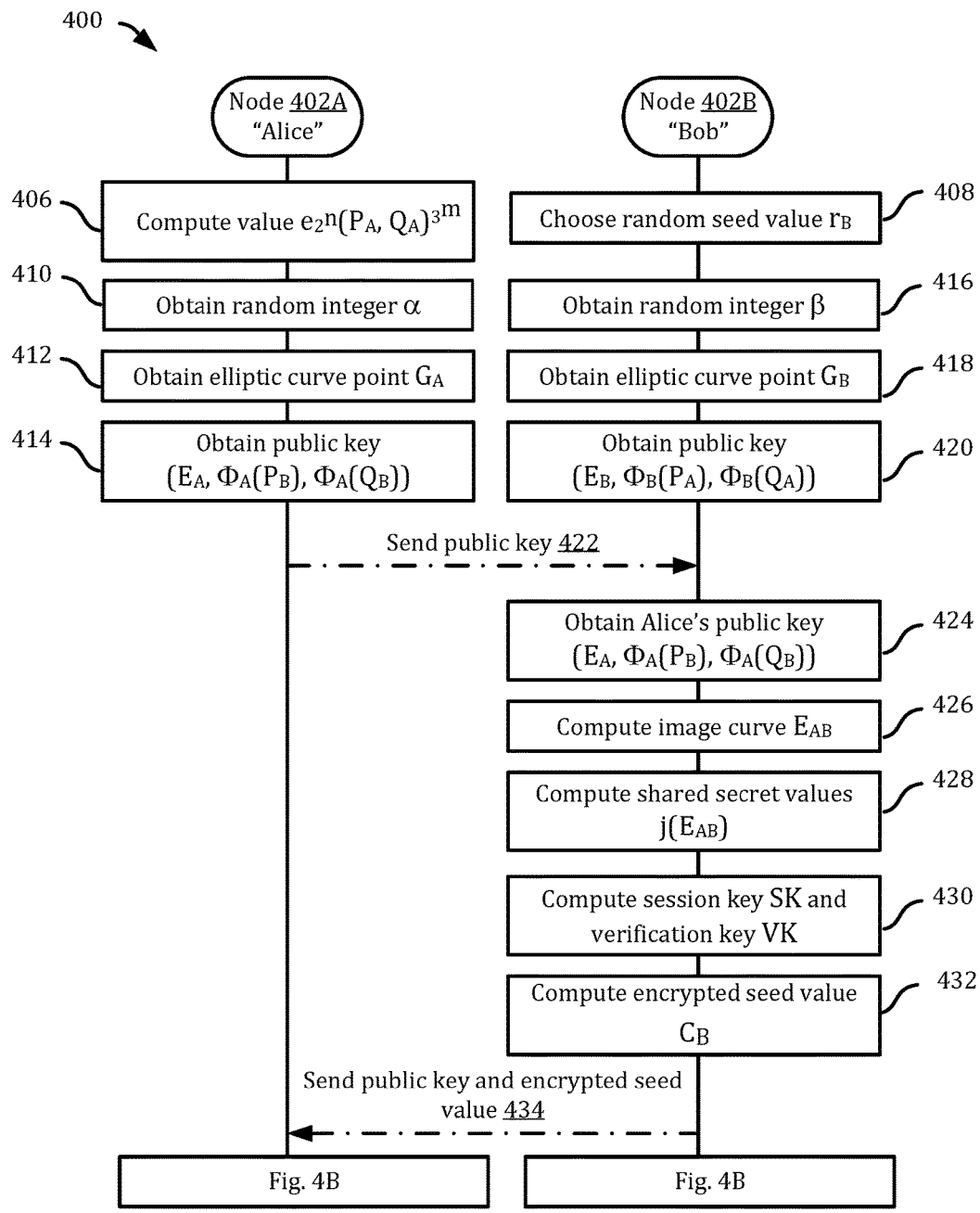
FIGS. 4A-4B are flow diagrams showing another example supersingular isogeny-based cryptographic protocol.
Figure 4B:
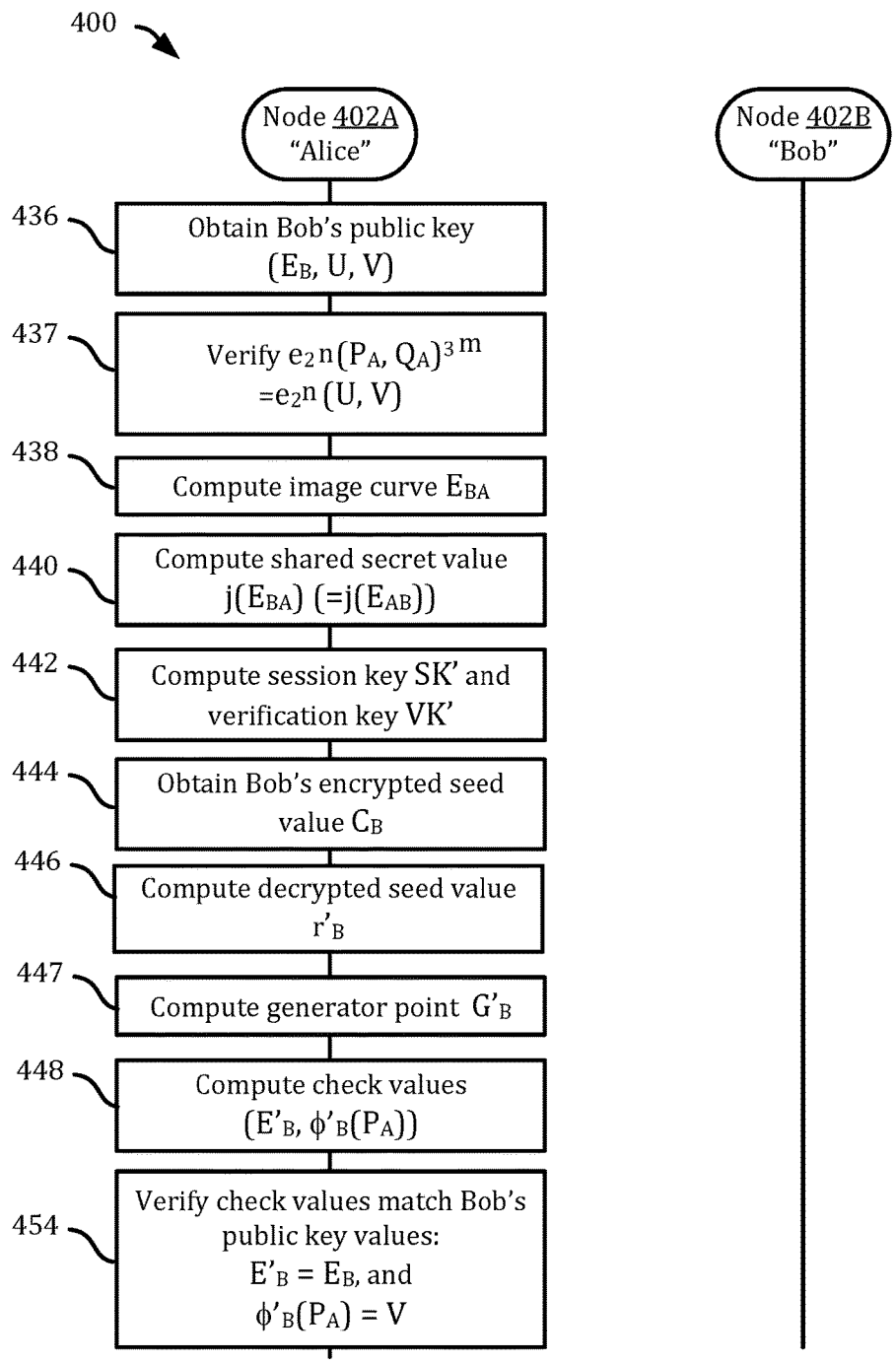

In some cryptographic protocols (including the example protocol 400 shown in FIGS. 4A-4B and variants), Alice verifies a pairing value and an isogeny evaluation (e.g., $e_{2^n}(U,V)=e_{2^n}(P_A,Q_A)^{3^m}$ and $\phi_B'(Q_A)=V$ in the example shown in FIGS. 4A-4B). Using the pairing-based validation allows Alice to validate Bob's public key using only one isogeny evaluation (e.g., $\phi_B'(Q_A)$). In addition, Alice can complete the pairing-based validation before computing any isogeny evaluations, which means that Alice can detect some invalid public keys without an isogeny evaluation. In addition, the example protocol 400 shown in FIGS. 4A-4B is secure, in the sense that it allows Alice to use a static key and detect if Bob dishonestly modified any of the parameters of his public key ($E_B$, $\phi_B(P_A)$, $\phi_B(Q_A)$).

In some cases, the public key validation techniques described here can be used to improve supersingular isogeny-based key agreement protocols (e.g., SIDH), as well as other supersingular isogeny-based cryptographic protocols. For example, the public key validation techniques described here may be applied to supersingular isogeny-based public key encryption schemes, such as, for example, the public key encryption scheme described by De Feo et al. (De Feo, et al., "Towards quantum-resistant cryptosystems from supersingular elliptic curve isogenies."*Journal of Mathematical Cryptology* 8 (3), pp. 209-247, 2014.). As another example, the public key validation techniques described here may be applied to supersingular isogeny-based key encapsulation mechanism (KEM) schemes.

FIG. 1 is a block diagram showing aspects of an example communication system 100. The example communication system 100 shown in FIG. 1 includes two nodes 102, 104. The nodes 102, 104 use a supersingular isogeny-based cryptosystem to communicate with each other over a channel 106. The nodes 102, 104 represent distinct entities in the cryptosystem.

In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, IoT devices, and other types of computer systems. As shown in FIG. 1, the example node 102 includes a memory 110, a processor 112, and an interface 114. Each of the nodes 102, 104 may include the same, additional or different components. The nodes 102, 104 may be configured to operate as shown and described with respect to FIG. 1 or in another manner.

In the example shown in FIG. 1, the entities represented by the nodes 102, 104 may correspond to a computing device, a computer system, an IP address or other network address, or another type of computer-readable identifier or instance of a computer resource. Accordingly, the computations and other operations of each entity may be performed by one or more processors or other elements of the respective node 102, 104. Similarly, information sent to or received by an entity may be sent to or received by an element (e.g., one or more processors, memories, or interfaces) of the respective node 102, 104.

The example memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in one or both of FIG. 2.

In the example node 102 shown in FIG. 1, the processor 112 is a data processing apparatus that can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in FIG. 2.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes (e.g., via channel 106). In some cases, the interface 114 includes a wireless communication interface that provides wireless communication using a wireless protocol or standard. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubit encodings. In some implementations, the quantum-enabled adversary 108 can operate in a fault-tolerant regime, or the quantum-enabled adversary may operate below the fault-tolerant regime.

Many public key cryptography systems ("cryptosystems") are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptography systems that are believed to be invulnerable to quantum attack. For example, supersingular isogeny-based protocols have been proposed as a quantum-resistant replacement for contemporary key agreement protocols such as the Diffie-Hellman (DH) and elliptic curve Diffie-Hellman (ECDH).

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptography systems (e.g., by computing a private key of a certificate authority or other entity based on public information).

The example quantum-enabled adversary 108 shown in FIG. 1 can access information exchanged on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptography systems. For example, the quantum-enabled adversary 108 may be capable of computing prime factors fast enough to compromise certain RSA-based cryptography systems or computing discrete logarithms fast enough to compromise certain ECC-based cryptography systems.

In the example shown in FIG. 1, the nodes 102, 104 may use a quantum-resistant cryptography system that cannot be compromised by the example quantum-enabled adversary 108. For instance, the nodes 102, 104 may use a cryptography system that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some implementations, the nodes 102, 104 use an encryption scheme that allows each node to send confidential messages to the other node, and the encryption scheme can be a quantum-resistant scheme that is not vulnerable to the quantum computing resources of the quantum-enabled adversary 108. Such digital signature schemes and encryption schemes can include or be used in conjunction with a key agreement protocol or a key encapsulation mechanism that is also secure against attacks by the quantum-enabled adversary 108. In some examples, the nodes 102, 104 can use the example techniques shown in FIG. 2, or the nodes 102, 104 may use variations of these and other techniques to communicate securely on the channel 106.

Figure 2:
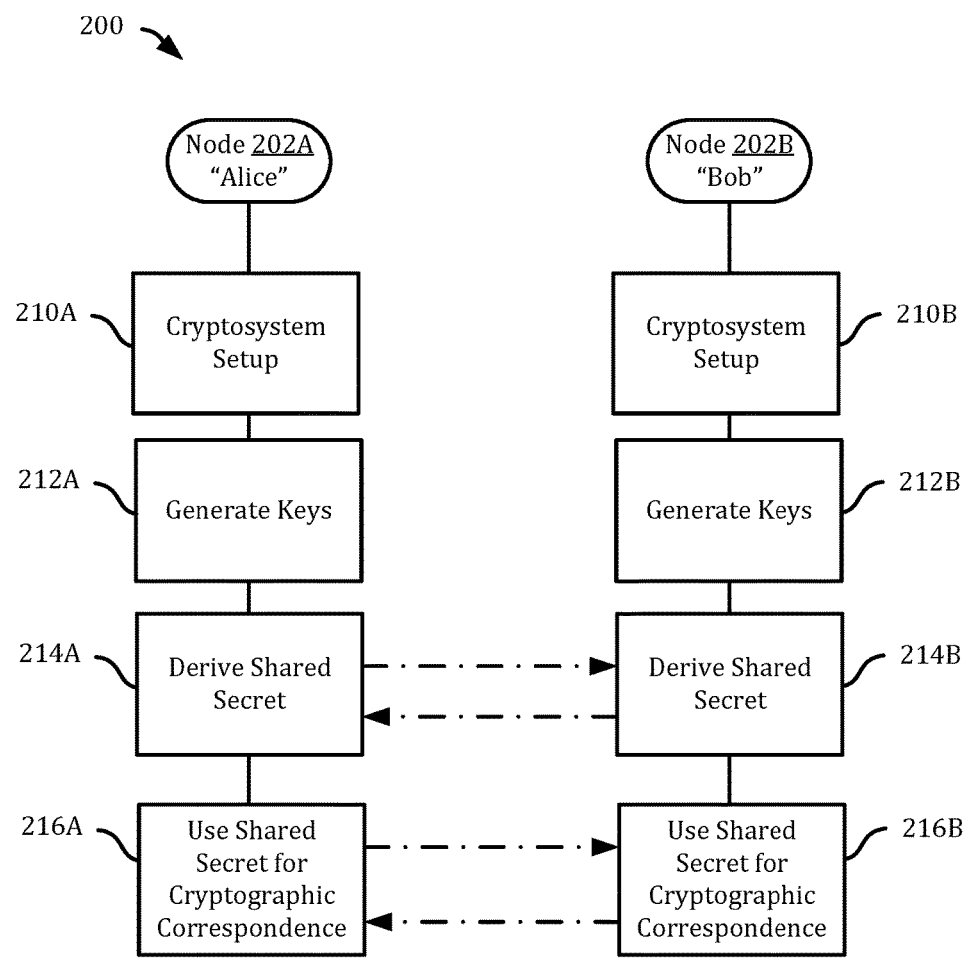
FIG. 2 is a flow diagram showing aspects of an example cryptosystem process.

FIG. 2 is a flow diagram showing aspects of an example cryptographic process 200. The example cryptographic process 200 can be performed, for example, by computer systems that can exchange information over a communication channel. For instance, operations in the cryptographic process 200 may be performed by the nodes 102, 104 in the example communication system 100 shown in FIG. 1 or in another type of system. The example process 200 may include additional or different operations, including operations performed by additional or different entities, and the operations may be performed in the order shown or in another order.

In some cases, one or more of the operations shown in FIG. 2 are implemented as processes that include multiple operations, sub-processes or other types of routines. For example, the processes shown in FIGS. 3A-3B and 4A-4B can be used, in some instances, to perform one or more of the example operations shown in FIG. 2. In some cases, operations can be combined, performed in parallel, iterated or otherwise repeated or performed in another manner.

The example process 200 shown in FIG. 2 includes operations performed by nodes 202A, 202B. In the example shown, the nodes 202A, 202B represent two distinct entities in a supersingular isogeny-based cryptosystem. The two distinct entities are referred to as "Alice" and "Bob" in FIG. 2. In the example shown, the nodes 202A, 202B exchange public data, and each node uses the public data provided by the other node to execute the process 200. In some cases, the nodes 202A, 202B may have a server-client relationship, a peer-to-peer relationship or another type of relationship. The nodes 202A, 202B may communicate with each other, for example, directly or indirectly, in each stage of the process 200. In some cases, the process 200 or individual operations within the process 200 can be executed by the nodes 202A, 202B over a period of seconds, or the process 200 may be executed over a shorter or longer period of time.

In the example shown in FIG. 2, each entity may correspond to a computing device, a computer system, an IP address or other network address, or another type of computer-readable identifier or instance of a computer resource. Accordingly, the computations and other operations of each entity may be performed by one or more processors or other elements of the respective node 202A, 202B. Similarly, information sent to or received by an entity may be sent to or received by an element (e.g., one or more processors, memories, or interfaces) of the respective node 202A, 202B.

In some examples, the cryptographic process 200 is secure against quantum-enabled adversaries such as, for example, the quantum-enabled adversary 108 shown in FIG. 1. For instance, in some cases, the example cryptographic process 200 is secure against certain types of attacks or other processes that can be performed by a quantum-enabled adversary who has access to public information exchanged between the server 202 and the client 204. The example cryptographic process 200 may also provide security against classically-enabled adversaries who do not have access to quantum computers or other quantum resources.

At 210A and 210B, the nodes 202A, 202B perform one or more cryptosystem setup operations. A supersingular isogeny-based cryptosystem can be described in terms of a supersingular elliptic curve E defined over a finite field $F_{p^2}$. Let p≥5 be a prime integer; let $F_{p^2}$ denote a finite field of characteristic p with $p^2$ elements; and let E be an elliptic curve defined over $F_{p^2}$. The cryptosystem setup operations at 210A, 210B can include defining the prime integer $p=l_A^n l_B^m f \pm 1$, where $l_A$ and $l_B$ are distinct prime integers, where f, n, and m are positive integers with f being coprime to $l_A$ and $l_B$, such that $l_A^n \approx l_B^m$. In some examples described here, $l_A=2$ and $l_B=3$, and $p=2^n 3^m f-1$, with f being coprime to 2 and 3, such that $2^n \approx 3^m$. In such examples, the elliptic curve E has $(2^n 3^m f)^2$ points.

The cryptosystem setup operations at 210A, 210B can include defining elliptic curve points $P_A$, $Q_A$, $P_B$, $Q_B$ on the elliptic curve E. For each elliptic curve point, a pair of numbers in the finite field $F_{p^2}$ can represent the x-coordinate and the y-coordinate. For instance, each coordinate can be expressed A+i*B for some integers A and B between 0 and p. Therefore, each elliptic curve point can be represented by four integers between 0 and p.

In examples where $l_A=2$ and $l_B=3$, $\{P_A,Q_A\}$ represents a basis of the set of $2^n$-torsion points $E[2^n]$, and $\{P_B,Q_B\}$ represents a basis of the set of $3^m$-torsion points $E[3^m]$; the order of elliptic curve points $P_A$ and $Q_A$ is $2^n$; and the order of elliptic curve points $P_B$ and $Q_B$ is $3^m$. The global system parameters p, E, $P_A,Q_A$, $P_B,Q_B$, p, $l_A$, $l_B$, f, n and m, which define a supersingular isogeny cryptosystem, can be published to, computed by, or otherwise made available to the nodes 202A, 202B. When a cryptographic protocol is executed with these parameters, one of the entities works over a first set of elliptic curve points defined by $l_A^n$ (e.g., $E[2^n]$), and the other entity works over a second set of elliptic curve points defined by $l_A^n$ (e.g., $E[3^m]$). In the examples described here (in FIGS. 3A-3B and 4A-4B), Alice and Bob agree that Alice will work over the set $E[2^n]$ and Bob will work over the set $E[3^m]$.

At 212A and 212B, the nodes 202A, 202B perform one or more operations to each generate a respective key pair. In some implementations, each respective node 202A, 202B produces a public-private key pair. For instance, a first public-private key pair for the first entity ("Alice") may be produced at 212A, and a second public-private key pair for the second entity ("Bob") may be produced at 212B. A public-private key pair of an entity includes a private key and a corresponding public key, which are related as prescribed by the cryptosystem. The private key is kept as a secret of the entity, while the public key can be published to other entities in the cryptosystem. In the example protocol 300 shown in FIGS. 3A-3B, Alice's and Bob's respective public-private key pairs are generated by operations 310, 312, 314 and 316, 318, 320. In the example protocol 400 shown in FIGS. 4A-4B, Alice's and Bob's respective public-private key pairs are generated by operations 410, 412, 414 and 408, 416, 418, 420. A public-private key pair may be generated in another manner. In some cases, a public-private key pair can be used as a static key pair or an ephemeral key pair.

At 214A and 214B, the nodes 202A, 202B perform one or more operations to derive a shared secret. In some implementations, the nodes 202A, 202B produce a shared secret value that can subsequently be used for cryptographic correspondence. For instance, deriving the shared secret at 214A, 214B may produce a secret value that is known to both entities (Alice and Bob), but is not publicly known or easily derivable from public information. In the example protocol 300 shown in FIGS. 3A-3B, the shared secret is the j-invariant value ($j(E_{AB})=j(E_{BA})$) computed at 328 and 340. In the example protocol 400 shown in FIGS. 4A-4B, the shared secret is the j-invariant value ($j(E_{AB})=j(E_{BA})$) computed at 428 and 440. In some cases, the protocol performed by each entity to derives the shared secret also validates the public key of the other entity. For example, the techniques described with respect to FIGS. 3A-3B and 4A-4B may be used to validate public keys.

At 216A and 216B, the shared secret (generated at 214A and 214B) is used for cryptographic correspondence. For example, the keys generated by a key agreement protocol may be used in in a supersingular isogeny-based cryptographic protocol to encrypt or decrypt a message, to sign or verify a message or to generate other parameters that are used for cryptographic correspondence. The keys may be used in another manner.

Two example cryptographic protocols 300, 400 are described below with respect to FIGS. 3A-3B and FIGS. 4A-4B. In the examples shown in FIGS. 3A-3B and FIGS. 4A-4B, the entities ("Alice" and "Bob") correspond to a computing device, a computer system, an IP address or other network address, or another type of computer-readable identifier or instance of a computer resource. Accordingly, the computations and other operations of each entity may be performed by one or more processors or other elements of the respective node. Similarly, information sent to or received by an entity may be sent to or received by an element (e.g., one or more processors, memories, or interfaces) of the respective node.

In some cases, the example cryptographic protocols 300, 400 can be modified, combined or extended. For example, in the example protocols 300, 400, each entity's private key is represented by a single integer ($\alpha$ for Alice, $\beta$ for Bob). However, private keys for supersingular isogeny-based cryptosystems can have another form. For instance, a private key may have the form ($\alpha_1$, $\alpha_2$) for some integers $\alpha_1$ and $\alpha_2$. However, it is possible to choose the private key of the form (1, α) or (α, 1), so that it is given by a single integer α. As another example, FIGS. 3A-3B and 4A-4B show operations in which Alice validates Bob's public key. The protocols 300, 400 can be modified such that, additionally or alternatively, Bob validates Alice's public key using analogous operations.

In some implementations, the protocols 300, 400 could be merged, for example, to form a hybrid of the two protocols. For instance, Bob may send his secret generator in place of the random seed. In turn, instead of using two isogeny evaluations, Alice may use one pairing computation and one isogeny evaluation. In this case, Alice would verify, for example, whether $e_{2^n}(U,V) = e_{2^n}(P_A, Q_A)^{3^m}$ holds. The protocols 300, 400 may be merged in another manner.

FIGS. 3A-3B are flow diagrams showing an example supersingular isogeny-based cryptographic protocol 300. The example protocol 300 shown in FIGS. 3A-3B can be performed, for example, by computer systems that can exchange information over a communication network. For instance, operations in the protocol 300 may be performed by the nodes 102, 104 in the example communication system 100 shown in FIG. 1 or in another type of system. The example protocol 300 may include additional or different operations, including operations performed by additional or different entities, and the operations may be performed in the order shown or in another order. In some cases, one or more of the operations shown in FIGS. 3A-3B are implemented as processes that include multiple operations, sub-processes or other types of routines. In some cases, operations can be combined, performed in parallel, iterated or otherwise repeated or performed in another manner.

The example protocol 300 shown in FIGS. 3A-3B includes operations performed by nodes 302A, 302B. In the example shown, the nodes 302A, 302B represent two distinct entities in a supersingular isogeny-based cryptosystem. The two distinct entities are referred to as "Alice" and "Bob" in FIGS. 3A-3B. In the example shown, the nodes 302A, 302B exchange public data, and each node uses the public data provided by the other node to execute the cryptography protocol 300. In some cases, the nodes 302A, 302B may have a server-client relationship, a peer-to-peer relationship or another type of relationship.

In some examples, the protocol 300 is secure against quantum-enabled adversaries such as, for example, the quantum-enabled adversary 108 shown in FIG. 1. For instance, in some cases, the example protocol 300 is secure against certain types of attacks or other processes that can be performed by a quantum-enabled adversary who has access to public information exchanged between the nodes 302A, 302B. The example protocol 300 may also provide security against classically-enabled adversaries who do not have access to quantum computers or other quantum resources.

At the beginning of the protocol 300, or before the protocol 300 is initiated, the nodes 302A, 302B receive global system parameters for a supersingular isogeny-based cryptosystem. For example, the nodes 302A, 302B may perform one or more of the operations of the cryptosystem setup 210A, 210B described with respect to FIG. 2, or the global system parameters may be obtained in another manner.

In the example shown in FIGS. 3A-3B, the global system parameters obtained by the nodes 302A, 302B include the parameters p, E, $P_A, Q_A, P_B, Q_B, l_A, l_B$, f, n and m described above with respect to FIG. 2. In some examples described here, $l_A=2$ and $l_B=3$, and $p=2^n 3^m f-1$, with f being coprime to 2 and 3, such that $2^n \approx 3^m$. The techniques in FIGS. 3A-3B can be adapted to other values. In the examples shown in FIGS. 3A-3B, Alice works over the set $E[2^n]$, and Bob works over the set $E[3^m]$. The respective set of points used by each entity can be established by agreement between the entities, by selection of one of the entities (e.g., the entity that initiates the protocol 300 can make a selection), based on a relationship of the entities (e.g., server-client), or otherwise before or during execution of the protocol 300.

In the example protocol 300, a number of values are obtained by each of the nodes 302A, 302B. For example, the nodes 302A, 302B each obtain integers, elliptic curves, image curves, elliptic curve points, image points, and various representations of these and other cryptographic values in the various operations shown in FIGS. 3A-3B. Generally, each of these values can be computed or otherwise obtained in any suitable manner, and each of these values can be stored or represented in any suitable form or format.

In some instances, a node 302A or 302B obtains or computes a value by retrieving the value from a remote or local memory or from another source; by invoking a specialized co-processor (e.g., a pseudorandom number generator, a cryptographic co-processor, a graphics processing unit, etc.) or another system to compute the value; by directly computing the value (e.g., by operation of a processor programmed by software, or another type of processor that is otherwise configured, to perform a computation that produces the value); or otherwise. In some examples, precomputed values, global system values of the cryptosystem, and other values can be received from memory (e.g., volatile or non-volatile memory); random integers (e.g., α, β, etc.) or other random values can be received from a pseudorandom generator or another source; elliptic curve points, image curves, isogenies or values can be computed by a cryptographic co-processor, a general-purpose processor, or another type of processor.

As shown in FIG. 3A, the node 302A performs operations 310, 312 and 314 to produce a public-private key pair for the first entity ("Alice"), and the node 302B performs operations 316, 318 and 320 to produce a public-private key pair for the second entity ("Bob"). Each node 302A, 302B may perform its respective operations to generate the public-private key pairs in parallel (e.g., potentially at the same time) or in series, and the operations may be performed independent of, or in response to, information from the other node. In some examples, node 302A generates Alice's public-private key pair first, and then node 302B generates Bob's public-private key pair after receiving Alice's public key at 322. The operations may be performed in another order, or in response to other conditions.

At 310, the node 302A obtains a random integer α, such that $0 \le \alpha \le 2^n$. Generally, the random integer can be in the range $0 \le \alpha < l_A^n$, for any appropriate value of $l_A^n$. The random integer α is kept secret, as Alice's secret key. In some cases, Alice uses the random integer α as a static private key or as an ephemeral private key. At 312, the node 302A obtains elliptic curve point $G_A = P_A + [\alpha]Q_A$. Here, the pair of elliptic curve points $(P_A, Q_A)$ is a global system parameter of the supersingular isogeny-based cryptosystem, and the elliptic curve point $G_A$ is a generator of the cyclic subgroup $\langle G_A \rangle$. Here, $[\alpha]Q_A$ denotes scalar point multiplication on the elliptic curve, where the point $Q_A$ is added to itself α times.

At 314, the node 302A generates Alice's public key. In the example shown in FIG. 3A, to generate Alice's public key, the node 302A computes an image curve $E_A$, and a pair of elliptic curve points $(\phi_A(P_B), \phi_A(Q_B))$. Here, the pair of elliptic curve points $(P_B, Q_B)$ is a global system parameter of the supersingular isogeny-based cryptosystem. In this example, the image curve $E_A=E/\langle G_A \rangle$ is the elliptic curve that is the image curve under the isogeny $\phi_A$; $\phi_A(P_B)$ is an elliptic curve point that is the image of $P_B$ under the isogeny $\phi_A$; and $\phi_A(Q_B)$ is an elliptic curve point that is the image of $Q_B$ under the isogeny $\phi_A$.

In the example shown in FIGS. 3A-3B, the isogeny $\phi_A$: $E \rightarrow E_A$ is an isogeny of degree $2^n$ with the kernel $\langle G_A \rangle$. An isogeny is generally defined by its kernel, and the generator of the kernel uniquely determines the isogeny. As such, the elliptic curve point $G_A$ uniquely determines the isogeny $\phi_A$. The degree of an isogeny generally refers the order of its kernel, or equivalently, the order of the point that generates the kernel. Thus, the degree of the isogeny $\phi_A$ is the order of the kernel $\langle G_A \rangle$, which is the order of the elliptic curve point $G_A$. The isogeny $\phi_A$ and the elliptic curve point $G_A$ can be maintained as secret information of Alice.

The image curve $E_A$ and image points $\phi_A(P_B)$, $\phi_A(Q_B)$ can be computed in any suitable manner. In some examples, the supersingular isogeny-based cryptosystem utilizes exponentially-large degree isogenies (e.g., $2^n$, $3^m$, etc.), and it may be infeasible or inefficient to directly compute such isogenies. However, an isogeny of degree $2^n$ can be computed as the composition of n isogenies of degree 2; similarly, an isogeny of degree $3^m$ can be computed as the composition of m isogenies of degree 3. Smaller degree isogenies (e.g., isogenies of degree 2, 3, 5, etc.) can be evaluated (e.g., to compute image curves and image points, etc.) efficiently, for example, using Vélu's formulas. Moreover, in some cases, isogeny evaluation at an elliptic curve point takes place while computing the image curve. For example, evaluating the elliptic curve E under the isogeny $\phi_A$ (to compute the image curve $E_A$) can include evaluating the elliptic curve points $(P_B, Q_B)$ under the isogeny $\phi_A$ to compute the image points $\phi_A(P_B)$, $\phi_A(Q_B)$. The image curve $E_A$ can be stored in any suitable manner, for example, an image curve can be represented by its coefficients. For instance, Montgomery curves can be represented using two elements in the field of definition.

At 316, the node 302B obtains a random integer $\beta$, such that $0 \leq \beta < 3^m$. Generally, the random integer can be in the range $0 \leq \alpha < 1_B^m$, for any appropriate value of $1_B^m$. The random integer $\beta$ is kept secret, as Bob's secret key. In some cases, Bob uses the random integer $\beta$ as a static private key or as an ephemeral private key. At 318, the node 302B obtains an elliptic curve point $G_B = P_B + [\beta]Q_B$. As noted, the pair of elliptic curve points $(P_B, Q_B)$ is a global system parameter of the supersingular isogeny-based cryptosystem, and the elliptic curve point $G_B$ is a generator of the cyclic subgroup $\langle G_B \rangle$. Here, $[\beta]Q_B$ denotes scalar point multiplication on the elliptic curve, where the point $Q_B$ is added to itself $\beta$ times.

At 320, the node 302B generates Bob's public key. In the example shown in FIG. 3A, to generate Bob's public key, the node 302B computes an image curve $E_B$, and a pair of elliptic curve points $\phi_B(P_A)$, $(\phi_B(Q_A))$. As noted, the pair of elliptic curve points $(P_A, Q_A)$ is a global system parameter of the supersingular isogeny-based cryptosystem. In this example, the image curve $E_B = E/\langle G_B \rangle$ is the elliptic curve that is the image curve under the isogeny $\phi B$; $\phi_B(P_A)$ is an elliptic curve point that is the image of $P_A$ under the isogeny $\phi_B$; and $\phi_B(Q_A)$ is an elliptic curve point that is the image of $Q_A$ under the isogeny $\phi_B$. In the example shown in FIGS. 3A-3B, the isogeny $\phi_B$: $E \rightarrow E_B$ is an isogeny of degree $3^m$ with the kernel $\langle G_B \rangle$. The image curve $E_B$ and image points $\phi_B(P_A)$, $\phi_B(Q_A)$ can be computed and stored at 320 in any suitable manner, using the techniques discussed above with respect to generating Alice's public key at 314.

At 322, the node 302A sends Alice's public key, and possibly other information, to the other node 302B, and the other node 302B receives the information sent by the node 302A. In the example shown in FIGS. 3A-3B, the set of values $(E_A, \phi_A(P_B), \phi_A(Q_B))$ represents Alice's public key. In the example shown in FIGS. 3A-3B, the node 302A may send information directly to the node 302B, or the node 302A may initiate transmission indirectly, for example, through a communication device or otherwise. Moreover, information may be sent in multiple transmissions or a single transmission over one or more communication networks or other channels. All or part of the information can be transmitted over a public channel, and may be observed by a quantum-enabled adversary or another type of adversary.

At 324, the node 302B obtains Alice's public key. For example, the node 302B may obtain Alice's public key from the node 302A, from memory or another remote or local source. At 326, the node 302B computes an image curve $E_{AB}$ under the isogeny $\psi_B: E_A \rightarrow E_{AB}$. Here, the isogeny $\psi_B$ is an isogeny of degree $3^m$ with kernel $\langle \phi_A(P_B) + [\beta]\phi_A(Q_B) \rangle$. The image curve $E_{AB}$ is computed based on the image curve $E_A$ and the image points $\phi_B(P_A)$, $\phi_B(Q_A)$ from Alice's public key. The image curve $E_{AB}$ can be computed (e.g., using Vélu's formulas) and stored (e.g., as coefficients or element in the field definition) using the techniques discussed above with respect to the generation of Alice's public key at 314.

At 328, the node 302B computes a shared secret value based on the image curve $E_{AB}$. The shared secret value is "shared" in the sense that the secret value is known (or to be known) by Alice and Bob. In the example shown in FIGS. 3A-3B, the shared secret is the j-invariant $j(E_{AB})$ of the image curve $E_{AB}$. The j-invariant of an elliptic curve is an element of the underlying finite field $F_{p^2}$, and it can be computed, for example, from the coefficients that define the elliptic curve. For example, the j-invariant of a Montgomery curve $(By^2=x^3+Ax^2+x)$ is given by $j=256(A^2-3)^3/(A^2-4)$. In this example, the j-invariant $j(E_{AB})$ can be represented as a pair of integer values each between 0 and p. In some implementations, the j-invariant can be computed or stored in another manner. In some cases, another value is used as the shared secret, for instance, another value that is based on or related to the j-invariant $j(E_{AB})$ of the image curve $E_{AB}$.

At 330, the node 302B computes a session key SK and a verification key VK. The session key SK and the verification key VK are configured for use in a symmetric key encryption scheme, such as, for example, AES or another type of symmetric key encryption protocol. In the example shown in FIGS. 3A-3B, the session key SK and the verification key VK are computed based on the shared secret (computed at 328). In some implementations, the session key SK and the verification key VK may be computed from the output of a key derivation function or another type of function applied to the shared secret value. For example, the session key SK and the verification key VK may be computed by parsing SK||VK=KDF(j($E_{AB}$)), where KDF represents a key derivation function and SK||VK represents the concatenation of the session key SK and the verification key VK. In some cases, the key derivation function KDF can be implemented using HMAC or another type of cryptographic hash function.

At 332, the node 302B computes an encrypted generator point $C_B$. In the example shown in FIGS. 3A-3B, the encrypted generator point $C_B$ is an encrypted version of Bob's generator point $G_B$, which the node 302B obtained at 318 as part of the key generation process that produced Bob's public-private key pair. In particular, Bob's generator point $G_B$ was computed based on Bob's secret integer β, and was used to produce Bob's public key ($E_B$, $\phi_B(P_A)$, $\phi_B(Q_A)$). The encrypted generator point $C_B$ is computed using the symmetric key SK and the verification key VK (computed at 330) in a symmetric key encryption function applied to Bob's generator point $G_B$. For instance, the encrypted generator point $C_B$ may be computed as $C_B$=Enc$_{VK}(G_B \oplus SK)$, where Enc represents the symmetric key encryption function (e.g., AES or other), and $\oplus$ denotes the exclusive-or ("XOR") operation. The encrypted generator point $C_B$ may be computed in another manner.

At 334, the node 302B sends Bob's public key and encrypted generator point $C_B$, and possibly other information, to the other node 302A, and the other node 302A receives the information sent by the node 302B. In the example shown in FIGS. 3A-3B, the set of values ($E_B$, $\phi_B(P_A)$, $\phi_B(Q_A)$) represents Bob's public key. In the example shown in FIGS. 3A-3B, the node 302B may send information directly to the node 302A, or the node 302B may initiate transmission indirectly, for example, through a communication device or otherwise. Moreover, information may be sent in multiple transmissions or a single transmission over one or more communication networks or other channels. All or part of the information can be transmitted over a public channel, and may be observed by a quantum-enabled adversary or another type of adversary.

At 336, the node 302A obtains Bob's public key. For example, the node 302A may obtain Bob's public key from the node 302B, from memory or another remote or local source. In the example shown in FIGS. 3A-3B, the set of values ($E_B$,U,V) represents Bob's public key as obtained by the node 302A at 336. If Bob is honest and the node 302A obtains an accurate and valid version of Bob's public key, then U=$\phi_B(P_A)$ and V=$\phi_B(Q_A)$. However, the node 302B may provide an inaccurate or otherwise invalid public key, or the node 302A may obtain a public key that has been otherwise corrupted. For instance, if Bob is dishonest or if the node 302B uses an invalid process to generate Bob's public-private key pair, the node 302B may publish an invalid public key, where U≠$\phi_B(P_A)$ or V≠$\phi_B(Q_A)$. Accordingly, in the example shown in FIGS. 3A-3B, the node 302A performs certain operations to validate the public key ($E_B$, U,V), for instance, to improve integrity and security of the protocol 300. In some implementations, the validation operations performed by the node 302A may thwart certain attacks on the cryptosystem and thereby prevent Bob or another adversary from gaining information about Alice's secret key (the secret integer α).

At 338, the node 302A computes an image curve $E_{BA}$ under the isogeny $\psi_A$: $E_B \rightarrow E_{BA}$. Here, the isogeny $\psi_A$ is an isogeny of degree $2^n$ with kernel $\langle U+[\alpha]V \rangle$. The image curve $E_{BA}$ is computed based on the image curve $E_B$ and the elliptic curve points U, V from Bob's public key obtained at 336. The image curve $E_{BA}$ can be computed (e.g., using Vélu's formulas) and stored (e.g., as coefficients or element in the field definition) using the techniques discussed above with respect to the generation of Alice's public key at 314.

At 340, the node 302A computes the shared secret value based on the image curve $E_{BA}$, and the shared secret value is now known by both Alice and Bob. In the example shown in FIGS. 3A-3B, the shared secret is computed at 340 by computing the j-invariant j($E_{BA}$) of the image curve $E_{BA}$, which is identical to the j-invariant j($E_{AB}$) computed at 328. The node 302A computes the shared secret value at 340 using a process that is analogous to the process used by the node 302B to compute the shared secret value at 328. For example, the j-invariant j($E_{BA}$) can be computed and stored by the node 302A as described with respect to the j-invariant j($E_{AB}$) computed at 328. In some cases, another value is used as the shared secret, for instance, another value that is based on or related to the j-invariant j($E_{BA}$) of the image curve $E_{BA}$.

At 342, the node 302A computes a session key SK' and a verification key VK'. The session key SK' and the verification key VK' are configured for use in a symmetric key encryption scheme, such as, for example, AES or another type of symmetric key encryption protocol. The session key SK' and the verification key VK' are computed at 342 in the same manner that the session key SK and the verification key VK are computed at 330, using analogous operations. In the example shown in FIGS. 3A-3B, the session key SK' and the verification key VK' are computed based on the shared secret (computed at 340). In some implementations, the session key SK' and the verification key VK' may be computed from the output of a key derivation function or another type of function applied to the shared secret value. For example, the session key SK' and the verification key VK' may be computed by parsing SK'||VK'=KDF(j($E_{BA}$)), where KDF represents the key derivation function used at 330 and SK'||VK' represents the concatenation of the session key SK' and the verification key VK'.

At 344, the node 302A obtains the encrypted generator point $C_B$ that was computed by the node 302B at 332. For example, the node 302A may obtain the encrypted generator point $C_B$ from the node 302B, from memory or another remote or local source.

At 346, the node 302A computes a decrypted generator point $G_B'$ based on encrypted generator point $C_B$. In the example shown in FIGS. 3A-3B, the decrypted generator point $G_B'$ is a decrypted version of the encrypted generator point $C_B$ sent by Bob at 334. The decrypted generator point $G_B'$ is computed using the symmetric key SK' and the verification key VK' (computed at 342) in a symmetric key decryption function applied to the encrypted generator point $C_B$. The symmetric key decryption function applied at 346 to decrypt the encrypted generator point $C_B$ corresponds to the symmetric key encryption function applied at 332 to encrypt Bob's generator point $G_B$. For instance, the decrypted generator point $G_B'$ may be computed as $G_B'$=Dec$_{VK'}(C_B) \oplus SK'$, where Dec represents the symmetric key decryption function (e.g., AES or other), and $\oplus$ denotes the exclusive-or ("XOR") operation. The decrypted generator point $G_B'$ may be computed in another manner.

In the example shown in FIGS. 3A-3B, the node 302A performs operations 348, 350, 352, 354, and possibly other operations to validate Bob's public key ($E_B$,U,V). In some instances, the process of validating Bob's public key determines that Bob's public key is invalid, and therefore, should be rejected. In such cases, the node 302A may determine that Alice's private key α has been potentially compromised or is otherwise vulnerable, and as such, may revoke or discard the public-private key pair generated at 310, 312, 314 and terminate the protocol 300. Bob's public key ($E_B$,U,V) may be deemed invalid by the node 302A if any of the validations or verifications performed at 350, 352 or 354 return a false value (e.g., if compared values do not match) or are otherwise not confirmed true. In some instances, the process of validating Bob's public key determines that Bob's public key is valid, and therefore, can be accepted. In such cases, the node 302A may determine that Alice's private key α can be reused without compromise or vulnerability, and as such, may recycle the public-private key pair generated at 310, 312, 314. Bob's public key ($E_B$,U,V) may be deemed valid by the node 302A if all the validations and verifications performed at 350, 352 or 354 return a true value (e.g., if all compared values match). In some implementations, Bob's public key ($E_B$,U,V) is validated in another manner.

At 348, node 302A computes check values ($E_B'$, $\phi_B'(P_A)$, $\phi_B'(Q_A)$) based on the decrypted generator $G_B'$. In the example shown in FIGS. 3A-3B, the check values ($E_B'$, $\phi_B'(P_A)$, $\phi_B'(Q_A)$) are computed from the decrypted generator point $G_B'$ at 348 using the operations that were used to compute Bob's public key ($E_B$, $\phi_B(P_A)$, $\phi_B(Q_A)$) from the generator point $G_B$ at 320. For example, the node 302A computes the image curve $E_B'$ from the decrypted generator point $G_B'$, and the pair of elliptic curve points $\phi_B'(P_A)$, $\phi_B'(Q_A)$ from the elliptic curve points ($P_A$,$Q_A$). In this example, the image curve $E_B'=E/\langle G_B'\rangle$ is the elliptic curve that is the image curve under the isogeny $\phi_B'$; $\phi_B'(P_A)$ is an elliptic curve point that is the image of $P_A$ under the isogeny $\phi_B'$; and $\phi_B'(Q_A)$ is an elliptic curve point that is the image of $Q_A$ under the isogeny $\phi_B'$. In the example shown in FIGS. 3A-3B, the isogeny $\phi_B':E \to E_B'$ is an isogeny of degree $3^m$ with the kernel $\langle G_B'\rangle$. The image curve $E_B'$ and image points $\phi_B'(P_A)$, $\phi_B'(Q_A)$ can be computed and stored at 348 in any suitable manner, using the techniques discussed above with respect to generating Alice's public key at 314.

At 350, the node 302A validates the degree of the isogeny $\phi_B'$ defined by the kernel $\langle G_B'\rangle$ identified by the decrypted generator point $G_B'$. The degree of the isogeny can be validated, for example, by verifying that $\deg(\phi_B')=1_B^m$, where "deg" denotes the degree. In the example shown in FIGS. 3A-3B, the node 302A explicitly verifies whether $\deg(\phi'_B)=3^m$, and if not, Bob's public key ($E_B$,U,V) is deemed invalid. Here, the degree of the isogeny $\phi'_B$ is the order of the kernel $\langle G_B'\rangle$, which is the order of the decrypted generator point $G_B'$. The validation performed at 350 can detect certain types of attacks. For example, the node 302B can detect if Bob cheats by sending $G_B'$ of order not equal to $1_B^m$.

At 352, the node 302A validates the value $j(E_B)$, which is the j-invariant of the image curve $E_B$ in Bob's public key ($E_B$,U,V). In the example shown in FIGS. 3A-3B, the node 302A verifies that $j(E_B) \neq 0$, 1728, and if not, Bob's public key ($E_B$,U,V) is deemed invalid. In other words, if the node 302A determines that $j(E_B)=0$ or $j(E_B)=1728$, then Bob's public key ($E_B$,U,V) is deemed invalid. In some implementations, the validation checks for other values of the j-invariant of the image curve $E_B$ in Bob's public key.

The validation performed at 352 can detect instances of the image curve $E_B$ in Bob's public key that could compromise security of the shared secret or create other vulnerabilities. In some cases, the validation performed at 352 ensures that the j-invariant of the image curve $E_B$ from Bob's public key is not a trivially small value. For instance, the values 0 and 1728 are too small for shared secrets and can easily be derived using a brute force attack. In some cases, the validation performed at 352 ensures that the image curve $E_B$ in Bob's public key is not isomorphic to the initial curve E defined in the global system parameters. For instance, in the example shown in FIGS. 3A-3B, the initial curve E is $y^2=x^3+x$ or $y^2=x^3-x$, both of which have the j-invariant 1728. Thus, if the j-invariant $j(E_B)$ is 1728, then the image curve $E_B$ is isomorphic to (the same as) the initial curve E, which can compromise security of the protocol 300. In some cases, the validation performed at 352 ensures that the j-invariant of the image curve $E_B$ in Bob's public key have small automorphism groups. For instance, curves with j-invariants equal to 0 or 1728 have large automorphism groups, and removing these values may ensure that the image curve $E_B$ has only two automorphisms, namely (x,y)→(x,y) (the identity map), and (x,y)→(x,-y) (the inversion map).

At 354, the node 302A verifies that the check values ($E_B'$, $\phi_B'(P_A)$, $\phi_B'(Q_A)$) computed at 348 match the corresponding values in Bob's public key ($E_B$,U,V) obtained at 336. In particular, the node 302A verifies that $E_B'=E_B$; $\phi_B'(P_A)=U$; and $\phi_B'(Q_A)=V$, and if not, Bob's public key ($E_B$,U,V) is deemed invalid. In other words, if the node 302A determines that $E_B' \neq E_B$; $\phi_B'(P_A) \neq U$; or $\phi_B'(Q_A) \neq V$, then Bob's public key ($E_B$,U,V) is deemed invalid.

Accordingly, if all verifications at 350, 352, 354 pass, then Bob's public key ($E_B$,U,V) can be deemed valid by the node 302A. In the examples discussed above, the node 302A verifies that $\deg(\phi_B')=3^m$; $j(E_B) \neq 0$, 1728; $E_B'=E_B$; $\phi_B'(P_A)=U$; and $\phi_B'(Q_A)=V$. And if the answer is "yes" to all checks (all verifications are "true"), the public key ($E_B$,U,V) is deemed valid, whereas if all the answer is "no" to any one of the checks (any of the verifications is "false"), the public key ($E_B$,U,V) is deemed invalid. In some cases, after the node 302A validates Bob's public key, the nodes 302A, 302B execute a cryptographic correspondence protocol using the shared secret value, for example, as described with respect to 216A, 216B in FIG. 2.

FIGS. 4A-4B are flow diagrams showing another example supersingular isogeny-based cryptographic protocol. The example protocol 400 shown in FIGS. 4A-4B can be performed, for example, by computer systems that can exchange information over a communication network. For instance, operations in the protocol 400 may be performed by the nodes 102, 104 in the example communication system 100 shown in FIG. 1 or in another type of system. The example protocol 400 may include additional or different operations, including operations performed by additional or different entities, and the operations may be performed in the order shown or in another order. In some cases, one or more of the operations shown in FIGS. 4A-4B are implemented as processes that include multiple operations, sub-processes or other types of routines. In some cases, operations can be combined, performed in parallel, iterated or otherwise repeated or performed in another manner.

The example protocol 400 shown in FIG. 4A-4B is similar to the example protocol 300 shown in FIG. 3A-3B, and many operations that can be performed in the same or similar manner, by the same or similar types of hardware. Generally, analogous operations in the two protocols 300, 400 can be performed using the same techniques, unless otherwise noted or implied by context.

At the beginning of the protocol 400, or before the protocol 400 is initiated, the nodes 402A, 402B receive global system parameters for a supersingular isogeny-based cryptosystem, as described with respect to FIGS. 3A-3B. In addition to obtaining the global system parameters and other setup operations described with respect to FIGS. 3A-3B, the node 402A in FIGS. 4A-4B computes the pairing value $e_{2^n}(P_A,Q_A)^{3^m}$ at 406. The pairing value $e_{2^n}(P_A,Q_A)^{3^m}$ computed at 406 is based on the pair of elliptic curve points ($P_A$,$Q_A$), and the values of $1_A$, $1_B$, n and m (here, $1_A=2$ and $1_B=3$) which are all global system parameters defined by the supersingular isogeny-based cryptosystem. Thus, the pairing value $e_{2^n}(P_A,Q_A)^{3^m}$ can be precomputed by the node 402A and saved as a system parameter to be reused as needed. In some cases, a pairing value $e_{l_A^n}(P_A,Q_A)^{l_B^m}$ is computed based on other values of $l_A$, $l_B$.

In the example shown in FIGS. 4A-4B, the pairing value is obtained at 406 by computing a Weil pairing. Another type of pairing, such as, for example, a Tate pairing, may be used. The Weil pairing $e_k$ takes as an input two points on the elliptic curve and returns an element a in the base field such that $a^k=1$. In the example protocol 400, $k=l_A^n$, $=2^n$, and the Weil pairing returns an element in the finite field $F_{p^2}$ of the form A+i*B, where A and B are integers between 0 and p. The value of the Weil pairing is then raised to power $3^m$ to compute the pairing value shown. The value of the Weil pairing may be computed, for example, using the so-called Miller's algorithm or possibly another technique.

As shown in FIG. 4A, the node 402A performs operations 410, 412 and 414 to produce a public-private key pair for the first entity ("Alice"), and the node 402B performs operations 408, 416, 418 and 420 to produce a public-private key pair for the second entity ("Bob"). Each node 402A, 402B may perform its respective operations generate the public-private key pairs in parallel (e.g., at the same time) or in series, and the operations may be performed independent of, or in response to, information from the other node. In some examples, node 402A generates Alice's public-private key pair first, and then node 402B generates Bob's public-private key pair after receiving Alice's public key at 422. The operations may be performed in another order, or in response to other conditions.

Operations 410, 412, 414 in FIG. 4A, which produce Alice's public-private key pair, can be executed in the manner described with respect to operations 310, 312, 314 in FIG. 3A. At 410, the node 402A obtains a random integer α, such that $0 \leq \alpha < 2^n$. At 412, the node 402A obtains elliptic curve point $G_A=P_A+[\alpha]Q_A$. At 414, the node 402A generates Alice's public key. In the example shown in FIG. 4A, to generate Alice's public key, the node 402A computes an image curve $E_A$, and a pair of elliptic curve points ($\phi_A(P_B)$, $\phi_A(\phi_B)$), as described with respect to FIG. 3A.

At 406, the node 402B obtains a random seed $r_B$. The random seed $r_B$ is chosen randomly. For example, the node 402B can use a function or program (e.g., provided by an operating system or other computing resource) that generates random values based on environmental noise collected from device drivers and other sources.

Operations 416, 418, 420 in FIG. 4A, which produce Bob's public-private key pair, can be executed in the manner described with respect to operations 316, 318, 320 in FIG. 3A; except that FIG. 4A shows that the random integer β is obtained at 416 based on the random seed $r_B$ obtained at 408. For example, the random seed $r_B$ can be used to seed (e.g., to refresh or randomize the state of) a pseudorandom generator, and the random integer β can then be obtained from the seeded pseudorandom generator. At 416, the node 402B obtains the random integer β, such that $0 \leq \beta < 3^m$. At 418, the node 402B obtains an elliptic curve point $G_B=P_B+[\beta]Q_B$. At 420, the node 402B generates Bob's public key. In the example shown in FIG. 4A, to generate Bob's public key, the node 402B computes an image curve $E_B$, and a pair of elliptic curve points $\phi_B(P_A)$, $\phi_B(Q_A)$ as described with respect to FIG. 3A.

At 422, the node 402A sends Alice's public key, and possibly other information, to the other node 402B, and the other node 402B receives the information sent by the node 402A. For example, information may be communicated between the nodes 402A, 402B as described with respect to the nodes 302A, 302B in FIG. 3A.

Operations 424, 426, 428, 430 in FIG. 4A can be executed in the manner described with respect to operations 324, 326, 328, 330 in FIG. 3A. At 424, the node 402B obtains Alice's public key. At 426, the node 402B computes an image curve $E_{AB}$ under the isogeny $\psi_B:E_A \rightarrow E_{AB}$. At 428, the node 402B computes a shared secret value based on the image curve $E_{AB}$. In the example shown in FIGS. 4A-4B, the shared secret is the j-invariant $j(E_{AB})$ of the image curve $E_{AB}$, as described with respect to the example shown in FIGS. 3A-3B. At 430, the node 402B computes a session key SK and a verification key VK. The session key SK and the verification key VK are configured for use in a symmetric key encryption scheme, such as, for example, AES or another type of symmetric key encryption protocol. In the example shown in FIGS. 4A-4B, the session key SK and the verification key VK are computed based on the shared secret value, as described with respect to FIGS. 3A-3B.

At 432, the node 402B computes an encrypted seed value $C_B$. In the example shown in FIGS. 4A-4B, the encrypted seed value $C_B$ is an encrypted version of Bob's seed value $r_B$, which the node 402B obtained at 408 as part of the key generation process that produced Bob's public-private key pair. In particular, Bob's generator point $G_B$ was computed based on Bob's seed value $r_B$, and was used to produce Bob's public key ($E_B$, $\phi_B(P_A)$, $\phi_B(Q_A)$). The encrypted seed value $C_B$ is computed using the symmetric key SK and the verification key VK (computed at 430) in a symmetric key encryption function applied to the seed value $r_B$. For instance, the encrypted seed value $r_B$ may be computed as $C_B=Enc_{VK}(r_B \oplus SK)$, where Enc represents the symmetric key encryption function (e.g., AES or other), and $\oplus$ denotes the exclusive-or ("XOR") operation. The encrypted seed value $C_B$ may be computed in another manner.

At 434, the node 402B sends Bob's public key and encrypted generator point $C_B$, and possibly other information, to the other node 402A, and the other node 402A receives the information sent by the node 402B. For example, information may be communicated between the nodes 402A, 402B as described with respect to the nodes 302A, 302B in FIG. 3A.

At 436, the node 402A obtains Bob's public key. For example, the node 402A may obtain Bob's public key from the node 402B, from memory or another remote or local source. In the example shown in FIGS. 4A-4B, the set of values ($E_B$,U,V) represents Bob's public key as obtained by the node 402A at 436. If Bob is honest and the node 402A obtains an accurate and valid version of Bob's public key, then U=$\phi_B(P_A)$ and V=$\phi_B(Q_A)$. As described with respect to FIGS. 3A-3B, the node 402A may obtain an invalid public key, where U≠$\phi_B(P_A)$ or V≠$\phi_B(Q_A)$. Accordingly, in the example shown in FIGS. 4A-4B, the node 402A performs certain operations to validate the public key ($E_B$,U,V), for instance, to improve integrity and security of the protocol 400. In some implementations, the validation operations performed by the node 402A may thwart certain attacks on the cryptosystem and thereby prevent Bob or another adversary from gaining information about Alice's secret key (the secret integer α).

At 437, the node 402A computes another pairing value $e_{2^n}(U,V)$ and verifies whether $e_{2^n}(U,V)=e_{2^n}(P_A,Q_A)^{3^m}$. In other words, the node 402A verifies whether the first pairing value obtained (at 406) from the global system parameters matches the second pairing value obtained from the pair of elliptic curve points in Bob's public key. In some cases, the pairing value $e_{2^n}(U,V)$ is computed to verify whether $e_{l_A^n}(U,$ $V)=e_{l_A''}(P_A,Q_A)^{l_B^m}$ based on other values of $l_A$, $l_B$. In the example shown in FIGS. 4A-4B, the second pairing value is obtained at 447 by computing a Weil pairing. Another type of pairing, such as, for example, a Tate pairing, may be used. The Weil pairing may be computed, for example, using the so-called Miller's algorithm or possibly another technique. Generally, the same type of pairing calculation is used at 406 (to compute $e_{2^n}(P_A,Q_A)^{3^m}$) and 447 (to compute $e_{2^n}(U,V)$). In the example shown in FIGS. 4A-4B, the node 402A verifies that $e_{2^n}(U,V)=e_{2^n}(P_A,Q_A)^{3^m}$, and if not, Bob's public key $(E_B,U,V)$ is deemed invalid. In other words, if the node 402A determines that $e_{2^n}(U,V) \neq e_{2^n}(P_A,Q_A)^{3^m}$, then Bob's public key $(E_B,U,V)$ is deemed invalid. As such, in the example shown in FIGS. 4A-4B, an invalid public key may be identified by the node 402A at 437, and the protocol 400 could then be terminated without performing further operations (e.g., one or more of 438, 440, 442, 444, 446, 447, 448, 454).

At 438, the node 402A computes an image curve $E_{BA}$ under the isogeny $\psi_A:E_B \rightarrow E_{BA}$. The image curve $E_{BA}$ may be computed at 438 as described with respect to operation 338 in FIG. 3B. At 440, the node 402A computes the shared secret value based on the image curve $E_{BA}$, and the shared secret value is now known by both Alice and Bob. In the example shown in FIGS. 4A-4B, the shared secret is computed at 440 by computing the j-invariant $j(E_{BA})$ of the image curve $E_{BA}$, which is identical to the j-invariant $j(E_{AB})$ computed at 428. The node 402A computes the shared secret value at 440 using a process that is analogous to the process used by the node 402B to compute the shared secret value at 428. In some cases, another value is used as the shared secret, for instance, another value that is based on or related to the j-invariant $j(E_{BA})$ of the image curve $E_{BA}$.

At 442, the node 402A computes a session key SW and a verification key VK'. The session key SW and the verification key VK' are configured for use in a symmetric key encryption scheme, such as, for example, AES or another type of symmetric key encryption protocol. The session key SW and the verification key VK' are computed at 442 in the same manner that the session key SK and the verification key VK are computed at 430, using analogous operations. In the example shown in FIGS. 4A-4B, the session key SK' and the verification key VK' are computed based on the shared secret (computed at 440). In some implementations, the session key SK' and the verification key VK' may be computed as described with respect to operation 342 in FIG. 3B.

At 444, the node 402A obtains the encrypted seed value $C_B$ that was computed by the node 402B at 432. For example, the node 402A may obtain the encrypted seed value $C_B$ from the node 402B, from memory or another remote or local source.

At 446, the node 402A computes a decrypted seed value $r_B'$ based on encrypted seed value $C_B$. In the example shown in FIGS. 4A-4B, the decrypted seed value $r_B'$ is a decrypted version of the encrypted seed value $C_B$ sent by Bob at 434. The decrypted seed value $r_B'$ is computed using the symmetric key SW and the verification key VK' (computed at 442) in a symmetric key decryption function applied to the encrypted seed value $C_B$. The symmetric key decryption function applied at 446 to decrypt the encrypted seed point $C_B$ corresponds to the symmetric key encryption function applied at 432 to encrypt Bob's random seed $r_B$. For instance, the decrypted seed value $r_B'$ may be computed as $r_B'=Dec_{VK'}(C_B) \oplus SK'$, where Dec represents the symmetric key decryption function (e.g., AES or other), and $\oplus$ denotes the exclusive-or ("XOR") operation. The decrypted generator point $G_B'$ may be computed in another manner.

At 447, the node 447 computes the generator point $G_B'$ from the decrypted seed value $r_B'$. The generator point $G_B'$ can be computed (at 447, by the node 402A) from the decrypted seed value $r_B'$ using the same operations that were used (at 416, 418, by the node 402B) to generate the elliptic curve point $G_B$ from the seed value $r_B$. For example, the node 402A can compute an integer $\beta'=PRF(r_B')$, and then compute $G_B'=P_B+[\beta']Q_B$.

In the example shown in FIGS. 4A-4B, the node 402A performs operations 437, 448, 454, and possibly other operations to validate Bob's public key $(E_B,U,V)$. In some instances, the process of validating Bob's public key determines that Bob's public key is invalid, and therefore, should be rejected. In such cases, the node 402A may determine that Alice's private key $\alpha$ has been potentially compromised or is otherwise vulnerable, and as such, may revoke or discard the public-private key pair generated at 410, 412, 414 and terminate the protocol 400. Bob's public key $(E_B,U,V)$ may be deemed invalid by the node 402A if any of the validations or verifications performed at 437 or 454 return a false value (e.g., if compared values do not match) or are otherwise not confirmed true. In some instances, the process of validating Bob's public key determines that Bob's public key is valid, and therefore, can be accepted. In such cases, the node 402A may determine that Alice's private key $\alpha$ can be reused without compromise or vulnerability, and as such, may recycle the public-private key pair generated at 410, 412, 414. Bob's public key $(E_B,U,V)$ may be deemed valid by the node 402A if all the validations and verifications performed at 437 and 454 return a true value (e.g., if all compared values match). In some implementations, Bob's public key $(E_B,U,V)$ is validated in another manner.

At 448, node 402A computes check values $(E_B', \phi_B'(Q_A))$ based on the generator point $G_B'$ computed at 446. In the example shown in FIGS. 4A-4B, the check values $(E_B', \phi_B'(Q_A))$ are computed from the generator point $G_B'$ at 448 using some of the operations that were used to compute Bob's public key $(E_B,\phi_B(P_A), \phi_B(Q_A))$ from the generator point $G_B$ at 420. For example, the node 402A computes the image curve $E_B'$ from the generator point $G_B'$, and the elliptic curve point $\phi_B'(Q_A)$ from the elliptic curve point $Q_A$. In this example, the image curve $E_B'=E/\langle G_B' \rangle$ is the elliptic curve that is the image curve under the isogeny $\phi_B'$; and $\phi_B'(Q_A)$ is an elliptic curve point that is the image of $Q_A$ under the isogeny $\phi_B'$. In the example shown in FIGS. 4A-4B, the isogeny $\phi_B': E \rightarrow E_B'$ is an isogeny of degree $3^m$ with the kernel $\langle G_B' \rangle$. The image curve $E_B'$ and image points $\phi_B'(P_A), \phi_B'(Q_A)$ can be computed and stored at 448 in any suitable manner, using the techniques discussed above with respect to generating Alice's public key at 414.

At 454, the node 402A verifies that the check values $(E_B', \phi_B'(Q_A))$ computed at 448 match the corresponding values $(E_B,V)$ from Bob's public key obtained at 436. In particular, the node 402A verifies that $E_B'=E_B$ and $\phi_B'(Q_A)=V$, and if not, Bob's public key $(E_B,U,V)$ is deemed invalid. In other words, if the node 402A determines that $E_B' \neq E_B$ or $\phi_B'(Q_A) \# V$, then Bob's public key $(E_B,U,V)$ is deemed invalid.

Accordingly, if all verifications at 447, 454 pass, then Bob's public key $(E_B,U,V)$ can be deemed valid by the node 402A. In the examples discussed above, the node 402A verifies that $e_{2^n}(U,V)=e_{2^n}(P_A,Q_A)^{3^m}$, $E_B'=E_B$, and $\phi_B'(Q_A)=V$; and if the answer is "yes" to all checks (all verifications are "true"), the public key ($E_B$,U,V) is deemed valid, whereas if all the answer is "no" to any one of the checks (any of the verifications is "false"), the public key ($E_B$,U,V) is deemed invalid. In some cases, after the node 402A validates Bob's public key, the nodes 402A, 402B execute a cryptographic correspondence protocol using the shared secret value, for example, as described with respect to 216A, 216B in FIG. 2.

The protocol 400 shown in FIGS. 4A-4B can be modified or extended. As an example, instead of verifying whether $\phi_B'(Q_A)=V$ holds, Alice could verify whether $\phi_B'([\gamma]P_A+[\delta]Q_A)=[\gamma]U+[\delta]V$ holds for some fixed values $\gamma$ and $\delta$ such that $0 \le \gamma, \delta < 2^n$. However, the secret key $\alpha$ would depend on the values of $\gamma$ and $\delta$, so Alice would choose $\alpha$ carefully. For example, if Alice picks $\gamma=1$ and $\delta=0$, then analysis shows that a should be odd, and if Alice picks $\gamma=1$ and $\delta=1$, then a should be even. As another example, instead of verifying whether $e_{2^n}(U,V) = e_{2^n}(P_A,Q_A)^{3^m}$ holds, Alice could verify whether $e_{2^n}([a]U+[b]V, [c]U+[d]V) = e_{2^n}(P_A,Q_A)^{3^m(ad-bc)}$ holds for some fixed values a, b, c and d such that $0 \le a, b, c, d < 2^n$. As another example, it is also possible to replace the Weil pairing $e_k(.,.)$ with another pairing $t_k(.,.)$, such as the Tate pairing, or another pairing that possesses the property $t_k(\phi(P), \phi(Q)) = t_k(P,Q)^{deg(\phi)}$, where $deg(\phi)$ denotes the degree of an isogeny $\phi$.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of what is described above, a supersingular isogeny-based cryptography process is performed. In some aspects, an entity validates another entity's public key. In some aspects, an entity provides its public key and further information to another entity, to enable the other entity to validate its public key. In some cases, a public key is validated in a manner that improves computational efficiency of a cryptographic protocol, improves security or integrity of a cryptographic protocol, or provides other technical advantages.

In a first example, a first public key of a first entity (e.g., "Alice" in the example shown in FIGS. 3A-3B) is received. The first public key comprises a first image curve (e.g., $E_A$ in the example shown in FIGS. 3A-3B) and a first pair of elliptic curve points (e.g., $\phi_A(P_B)$, $\phi_A(Q_B)$) in the example shown in FIGS. 3A-3B). The first pair of elliptic curve points represent an image of a second pair of elliptic curve points (e.g., $(P_B,Q_B)$ in the example shown in FIGS. 3A-3B) under a first isogeny (e.g., $\phi_A$ in the example shown in FIGS. 3A-3B). A secret integer (e.g., $\beta$ in the example shown in FIGS. 3A-3B) of a second entity (e.g., "Bob" in the example shown in FIGS. 3A-3B) is obtained. A second public key of the second entity is generated based on the secret integer. The second public key comprises a second image curve (e.g., $E_B$ in the example shown in FIGS. 3A-3B) and a third pair of elliptic curve points (e.g., $\phi_B(P_A)$, $\phi_B(Q_A)$) in the example shown in FIGS. 3A-3B). The third pair of elliptic curve points represent an image of a fourth pair of elliptic curve points (e.g., $(P_A,Q_A)$ in the example shown in FIGS. 3A-3B) under a second isogeny (e.g., $\phi_B$ in the example shown in FIGS. 3A-3B). A first generator point (e.g., $G_B$ in the example shown in FIGS. 3A-3B), based on the secret integer and the second pair of elliptic curve points is obtained. A third image curve (e.g., $E_{AB}$ in the example shown in FIGS. 3A-3B) is computed based on the secret integer and the first pair of elliptic curve points. A shared secret value (e.g., $j(E_{AB})$ in the example shown in FIGS. 3A-3B) is computed based on the third image curve. The shared secret value is to be shared by the first entity and the second entity. An encrypted generator point (e.g., $C_B$ in the example shown in FIGS. 3A-3B) is computed from the first generator point and the shared secret value. The second public key is sent to the first entity to enable the first entity to compute the shared secret value. The encrypted generator point is sent to the first entity to enable the first entity to validate the second public key. The shared secret value can then be used to execute cryptographic correspondence over a communication network between the first entity and the second entity.

In a second example, a computing system includes one or more processors and a computer-readable medium storing instructions that are operable when executed by the one or more processors to perform one or more operations of the first example.

In a third example, a computer-readable medium stores instructions that are operable when executed by a data processing apparatus to perform one or more operations of the first example.

Implementations of the first, second, or third example may include one or more of the following features. Obtaining the first generator point can include computing $G_B=P_B+[\beta]Q_B$, where $G_B$ represents the first generator point, $\beta$ represents the secret integer of the second entity, and $(P_B, Q_B)$ represents the second pair of elliptic curve points. The first generator point $G_B$ is a generator of a cyclic subgroup $\langle G_B \rangle$. The encrypted generator point can be computed by applying a symmetric key encryption function to the first generator point. A session key and a verification key can be computed based on the shared secret value. The symmetric key encryption function can use the session key and the verification key to generate the encrypted generator point.

In a fourth example, a secret integer (e.g., $\alpha$ in the example shown in FIGS. 3A-3B) of a first entity (e.g., "Alice" in the example shown in FIGS. 3A-3B) is obtained. A public key of a second entity (e.g., "Bob" in the example shown in FIGS. 3A-3B) is received. The public key includes a first image curve (e.g., $E_B$ in the example shown in FIGS. 3A-3B) and a first pair of elliptic curve points (e.g., (U,V) in the example shown in FIGS. 3A-3B). A second image curve (e.g., $E_{BA}$ in the example shown in FIGS. 3A-3B) is computed based on the secret integer and the first pair of elliptic curve points. A shared secret value (e.g., $j(E_{BA})$ in the example shown in FIGS. 3A-3B) is computed based on the second image curve. An encrypted generator point (e.g., $C_B$ in the example shown in FIGS. 3A-3B), generated by the second entity, is received. A decrypted generator point (e.g., $G_B'$ in the example shown in FIGS. 3A-3B) is computed by decrypting the encrypted generator point. The decrypted generator point is used to validate the public key. The shared secret value can then be used to execute cryptographic correspondence over a communication network between the first entity and the second entity.

In a fifth example, a computing system includes one or more processors and a computer-readable medium storing instructions that are operable when executed by the one or more processors to perform one or more operations of the fourth example.

In a sixth example, a computer-readable medium stores instructions that are operable when executed by a data processing apparatus to perform one or more operations of the fourth example.

Implementations of the fourth, fifth, or sixth example may include one or more of the following features. The decrypted generator point can be decrypted by applying a symmetric key decryption function to the encrypted generator point. A session key and a verification key can be computed based on the shared secret value. The symmetric key decryption function can use the session key and the verification key to generate the decrypted generator point.

Implementations of the fourth, fifth, or sixth example may include one or more of the following features. Using the decrypted generator point to validate the public key can include validating the degree of an isogeny having the kernel $\langle G_B' \rangle$, where $G_B'$ represents the decrypted generator point. For example, validating the degree of an isogeny can include validating $\deg(\phi_B')=3^m$, where $\phi_B'$ is the isogeny having the kernel $\langle G_B' \rangle$, and m is an integer defined by the supersingular isogeny-based cryptosystem. Using the decrypted generator point to validate the public key can include using the decrypted generator point to compute a second pair of elliptic curve points (e.g., $\phi_B'(P_A)$, $\phi_B'(Q_A)$ in the example shown in FIGS. 3A-3B), wherein the second pair of elliptic curve points represent an image of a third pair of elliptic curve points (e.g., $(P_A,Q_A)$ in the example shown in FIGS. 3A-3B) under an isogeny having a kernel defined by the decrypted generator point. Using the decrypted generator point to validate the public key can include verifying that the second pair of elliptic curve points matches the first pair of elliptic curve points. Using the decrypted generator point to validate the public key can include computing a third image curve (e.g., $E_B'$ in the example shown in FIGS. 3A-3B) based on the decrypted generator point; and verifying that the third image curve matches the first image curve. Validating the public key can include validating the j-invariant of the first image curve (e.g., $E_B$ in the example shown in FIGS. 3A-3B). For example, validating the j-invariant of the first image curve can include verifying that $j(E_B) \neq 0, 1728$, where $E_B$ represents the first image curve. Using the decrypted generator point to validate the public key can include determining that the pubic key is valid, wherein the first pair of elliptic curve points represent an image of a second pair of elliptic curve points (e.g., $(P_A,Q_A)$ in the example shown in FIGS. 3A-3B) under an isogeny (e.g., $\phi_B$ in the example shown in FIGS. 3A-3B).

In a seventh example, a secret integer (e.g., a in the example shown in FIGS. 4A-4B) of a first entity (e.g., "Alice" in the example shown in FIGS. 4A-4B) is obtained. A public key of a second entity (e.g., "Bob" in the example shown in FIGS. 4A-4B) is obtained. The public key includes a first image curve (e.g., $E_B$ in the example shown in FIGS. 4A-4B) and a first pair of elliptic curve points (e.g., (U,V) in the example shown in FIGS. 4A-4B). A first pairing value (e.g., $e_{2^n}(P_A,Q_A)^{3^m}$ in the example shown in FIGS. 4A-4B), based on a second pair of elliptic curve points (e.g., $(P_A,Q_A)$ in the example shown in FIGS. 4A-4B) defined by a supersingular isogeny-based cryptosystem, is obtained. A second pairing value (e.g., $e_{2^n}(U,V)$ in the example shown in FIGS. 4A-4B) is computed based on the first pair of elliptic curve points. The public key is validated, and validating the public key includes verifying whether the first pairing value matches the second pairing value. A second image curve (e.g., $E_{BA}$ in the example shown in FIGS. 4A-4B) is computed based on the secret integer and the first pair of elliptic curve points. A shared secret value (e.g., j ($E_{BA}$) in the example shown in FIGS. 4A-4B) is computed based on the second image curve. The shared secret value is shared by the first entity and the second entity. The shared secret value can then be used to execute cryptographic correspondence over a communication network between the first entity and the second entity.

In an eighth example, a computing system includes one or more processors and a computer-readable medium storing instructions that are operable when executed by the one or more processors to perform one or more operations of the seventh example.

In a ninth example, a computer-readable medium stores instructions that are operable when executed by a data processing apparatus to perform one or more operations of the seventh example.

Implementations of the seventh, eighth, or ninth example may include one or more of the following features. The first pairing value can be based on a Weil pairing in a base field, and the second pairing value can be based on a Weil pairing in the base field.

Implementations of the seventh, eighth, or ninth example may include one or more of the following features. A generator point (e.g., $G_B'$ in the example shown in FIGS. 4A-4B) can be computed based on information from the second entity. Check values can be computed based on the generator point. Validating the public key can include verifying that the check values match respective values in the public key. Computing the generator point based on information from the second entity can include obtaining an encrypted seed value (e.g., $C_B$ in the example shown in FIGS. 4A-4B) from the second entity; computing a decrypted seed value (e.g., $r_B'$ in the example shown in FIGS. 4A-4B) by decrypting the encrypted seed value; and computing the generator point based on the decrypted seed value.

Implementations of the seventh, eighth, or ninth example may include one or more of the following features. Validating the public key can include using the generator point to compute a first elliptic curve point (e.g., $\phi_B'(Q_A)$ in the example shown in FIGS. 4A-4B) representing an image of a second elliptic curve point $(Q_A)$ under an isogeny (e.g., $\phi_B'$ in the example shown in FIGS. 4A-4B) having a kernel (e.g., $\langle G_B' \rangle$ in the example shown in FIGS. 4A-4B) defined by the generator point, where the second elliptic curve point is one of the elliptic curve points in the second pair of elliptic curve points; and verifying that the first elliptic curve point matches one of the elliptic curve points (e.g., V in the example shown in FIGS. 4A-4B) in the first pair of elliptic curve points. Validating the public key can include computing a third image curve (e.g., $E_B'$ in the example shown in FIGS. 4A-4B) based on the generator point; and verifying that the third image curve matches the first image curve.

Implementations of the seventh, eighth, or ninth example may include one or more of the following features. Validating the public key can require only one isogeny evaluation. The first pairing value can be precomputed by the first entity before receiving the public key. Validating the public key can include determining that the second pubic key is valid, wherein the first pair of elliptic curve points represent an image of the second pair of elliptic curve points under an isogeny (e.g., $\phi_B$ in the example shown in FIGS. 4A-4B).

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A supersingular isogeny-based cryptography method, comprising:
   obtaining a first public key of a first entity, the first public key comprising a first image curve and a first pair of elliptic curve points, wherein the first pair of elliptic curve points represent an image of a second pair of elliptic curve points under a first isogeny;
   obtaining a secret integer of a second entity;
   obtaining a second public key of the second entity based on the secret integer, the second public key comprising a second image curve and a third pair of elliptic curve points, wherein the third pair of elliptic curve points represent an image of a fourth pair of elliptic curve points under a second isogeny;
   obtaining a first generator point based on the secret integer and the second pair of elliptic curve points;
   computing, by operation of one or more processors, a third image curve based on the secret integer and the first pair of elliptic curve points;
   computing, by operation of one or more processors, a shared secret value based on the third image curve;
   computing, by operation of one or more processors, an encrypted generator point from the first generator point and the shared secret value;
   sending, to the first entity, the second public key to enable the first entity to compute the shared secret value; and
   sending, to the first entity, the encrypted generator point to enable the first entity to validate the second public key.

2. The supersingular isogeny-based cryptography method of claim 1, wherein obtaining the first generator point comprises computing $G_B = P_B [\beta] Q_B$, where $G_B$ represents the first generator point, $\beta$ represents the secret integer of the second entity, and $(P_B, Q_B)$ represents the second pair of elliptic curve points, and wherein the first generator point $G_B$ is a generator of a cyclic subgroup $\langle G_B \rangle$.

3. The supersingular isogeny-based cryptography method of claim 1, wherein the encrypted generator point is computed by applying a symmetric key encryption function to the first generator point.

4. The supersingular isogeny-based cryptography method of claim 3, comprising computing a session key and a verification key based on the shared secret value, wherein the symmetric key encryption function uses the session key and the verification key to generate the encrypted generator point.

5. The supersingular isogeny-based cryptography method of claim 1, wherein computing the shared secret comprises computing the j-invariant of the third image curve, and the method further comprises using the shared secret value to execute cryptographic correspondence over a communication network between the first entity and the second entity.

6. The supersingular isogeny-based cryptography method of claim 1, further comprising using the shared secret value to execute cryptographic correspondence over a communication network between the first entity and the second entity.

7. A non-transitory computer-readable medium storing instructions that are operable when executed by data processing apparatus to perform operations comprising:
   obtaining a first public key of a first entity, the first public key comprising a first image curve and a first pair of elliptic curve points, wherein the first pair of elliptic curve points represent an image of a second pair of elliptic curve points under a first isogeny;
   obtaining a secret integer of a second entity;
   obtaining a second public key of the second entity based on the secret integer, the second public key comprising a second image curve and a third pair of elliptic curve points, wherein the third pair of elliptic curve points represent an image of a fourth pair of elliptic curve points under a second isogeny;
   obtaining a first generator point based on the secret integer and the second pair of elliptic curve points;
   computing a third image curve based on the secret integer and the first pair of elliptic curve points;
   computing a shared secret value based on the third image curve;
   computing an encrypted generator point from the first generator point and the shared secret value;
   sending, to the first entity, the second public key to enable the first entity to compute the shared secret value; and
   sending, to the first entity, the encrypted generator point to enable the first entity to validate the second public key.

8. The non-transitory computer-readable medium of claim 7, wherein obtaining the first generator point comprises computing $G_B = P_B [\beta] Q_B$, where $G_B$ represents the first generator point, $\beta$ represents the secret integer of the second entity, and $(P_B, Q_B)$ represents the second pair of elliptic curve points, and wherein the first generator point $G_B$ is a generator of a cyclic subgroup $\langle G_B \rangle$.

9. The non-transitory computer-readable medium of claim 7, wherein the encrypted generator point is computed by applying a symmetric key encryption function to the first generator point.

10. The non-transitory computer-readable medium of claim 9, the operations comprising computing a session key and a verification key based on the shared secret value, wherein the symmetric key encryption function uses the session key and the verification key to generate the encrypted generator point.

11. The non-transitory computer-readable medium of claim 7, wherein computing the shared secret comprises computing the j-invariant of the third image curve, and the operations further comprise using the shared secret value to execute cryptographic correspondence over a communication network between the first entity and the second entity.

12. The non-transitory computer-readable medium of claim 7, the operations further comprising using the shared secret value to execute cryptographic correspondence over a communication network between the first entity and the second entity.

13. A computing device, comprising:
   one or more processors; and
   memory storing instructions that are operable when executed by the one or more processors to perform operations comprising:
      obtaining a first public key of a first entity, the first public key comprising a first image curve and a first pair of elliptic curve points, wherein the first pair of elliptic curve points represent an image of a second pair of elliptic curve points under a first isogeny;
      obtaining a secret integer of a second entity;
      obtaining a second public key of the second entity based on the secret integer, the second public key comprising a second image curve and a third pair of elliptic curve points, wherein the third pair of elliptic curve points represent an image of a fourth pair of elliptic curve points under a second isogeny;
      obtaining a first generator point based on the secret integer and the second pair of elliptic curve points;

computing a third image curve based on the secret integer and the first pair of elliptic curve points;

computing a shared secret value based on the third image curve;

computing an encrypted generator point from the first generator point and the shared secret value;

sending, to the first entity, the second public key to enable the first entity to compute the shared secret value; and sending, to the first entity, the encrypted generator point to enable the first entity to validate the second public key.

14. The computing device of claim 13, wherein obtaining the first generator point comprises computing $G_B = P_B [\beta] Q_B$, where $G_B$ represents the first generator point, $\beta$ represents the secret integer of the second entity, and $(P_B, Q_B)$ represents the second pair of elliptic curve points, and wherein the first generator point $G_B$ is a generator of a cyclic subgroup $\langle G_B \rangle$.

15. The computing device of claim 13, wherein the encrypted generator point is computed by applying a symmetric key encryption function to the first generator point.

16. The computing device of claim 15, the operations comprising computing a session key and a verification key based on the shared secret value, wherein the symmetric key encryption function uses the session key and the verification key to generate the encrypted generator point.

17. The computing device of claim 13, wherein computing the shared secret comprises computing the j-invariant of the third image curve, and the operations further comprise using the shared secret value to execute cryptographic correspondence over a communication network between the first entity and the second entity.

18. The computing device of claim 13, the operations further comprising using the shared secret value to execute cryptographic correspondence over a communication network between the first entity and the second entity.

* * * * *

UNITED STATES PATENT AND TRADEMARK OFFICE
CERTIFICATE OF CORRECTION

PATENT NO. : 10,313,124 B1
APPLICATION NO. : 16/220074
DATED : June 4, 2019
INVENTOR(S) : Kalach et al.

It is certified that error appears in the above-identified patent and that said Letters Patent is hereby corrected as shown below:

On the Title Page

Page 2 In Column 1, (56): Other Publications, Line 13, delete "De Fed, et al.," and insert -- De Feo, et al., -- therefor.

In the Specification

In Column 2, Line 18, delete "$U_1$" and insert -- $U_i$ -- therefor.

In Column 10, Line 50, delete "$0 \leq \alpha \leq 2^n$." and insert -- $0 \leq \alpha < 2^n$. -- therefor.

In Column 10, Line 65, delete "$\Phi_A(P_B), \Phi_A(Q_B))$." and insert -- $(\Phi_A(P_B), \Phi_A(Q_B))$. -- therefor.

In Column 11, Line 58, delete "$\Phi_B (P_A), (\Phi_B (Q_A)$." and insert -- $\Phi_B(P_A), \Phi_B(Q_A)$. -- therefor.

In Column 11, Line 63, delete "$\Phi B$;" and insert -- $\Phi_B$; -- therefor.

In Column 15, Line 38, delete "$deg(\Phi'_B)=3^m$," and insert -- $deg(\Phi_B')=3^m$, -- therefor.

In Column 15, Line 39, delete "$\Phi'_B$" and insert -- $\Phi_B'$ -- therefor.

In Column 17, Line 10, delete "$k=l_A^n, =2^n$," and insert -- $k=l_A^n =2^n$, -- therefor.

In Column 17, Line 41, delete "$\Phi_A(\Phi_B))$," and insert -- $\Phi_A(Q_B))$, -- therefor.

In Column 18, Line 67, delete "$e_{2^n}(U,V)$," and insert -- $e_{l_A^n}(U, V)$ -- therefor.

In Column 19, Line 35, delete "SW" and insert -- SK' -- therefor.

Signed and Sealed this
Third Day of September, 2019

Andrei Iancu
*Director of the United States Patent and Trademark Office*

CERTIFICATE OF CORRECTION (continued)
U.S. Pat. No. 10,313,124 B1

In Column 19, Line 36, delete "SW" and insert -- SK' -- therefor.

In Column 19, Line 40, delete "SW" and insert -- SK' -- therefor.

In Column 19, Line 59, delete "SW" and insert -- SK' -- therefor.

In Column 20, Line 41, delete "$(E_B\phi_B(P_A),$" and insert -- $(E_B, \phi_B(P_A),$ -- therefor.

In Column 20, Line 56, delete "$(E_B'\phi_B'(Q_A))$" and insert -- $(E_B', \phi_B'(Q_A))$ -- therefor.

In Column 20, Line 61, delete "$\Phi_B'(Q_A)\#V,$" and insert -- $\Phi_B'(Q_A)\neq V,$ -- therefor.

In Column 21, Line 15, delete "a" and insert -- $\alpha$ -- therefor.

In Column 21, Line 16, delete "a" and insert -- $\alpha$ -- therefor.

In Column 23, Line 28, delete "$\phi_A(P_B),$" and insert -- $(\phi_A(P_B),$ -- therefor.

In Column 23, Line 39, delete "$\phi_B (P_A), \phi_B (Q_A))$" and insert -- $(\phi_B(P_A), \phi_B(Q_A))$ -- therefor.

In Column 25, Line 26, delete "a in" and insert -- $\alpha$ in -- therefor.

In Column 25, Line 45, delete "j $(E_{BA})$" and insert -- $j(E_{BA})$ -- therefor.

In the Claims

In Column 27, Line 33, Claim 2, delete "$G_B=P_B [\beta]Q_B,$" and insert -- $G_B=P_B+[\beta]Q_B,$ -- therefor.

In Column 28, Line 22, Claim 8, delete "$G_B=P_B [\beta]Q_B,$" and insert -- $G_B=P_B+[\beta]Q_B,$ -- therefor.

In Column 29, Line 14, Claim 14, delete "$G_B=P_B [\beta]Q_B,$" and insert -- $G_B=P_B+[\beta]Q_B,$ -- therefor.